(12) United States Patent
Sugita

(10) Patent No.: US 7,502,350 B2
(45) Date of Patent: Mar. 10, 2009

(54) COMMUNICATION APPARATUS, METHOD AND PROGRAMS

(75) Inventor: Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1122 days.

(21) Appl. No.: 10/338,914

(22) Filed: Jan. 9, 2003

(65) Prior Publication Data

US 2003/0165126 A1    Sep. 4, 2003

(30) Foreign Application Priority Data

Jan. 16, 2002    (JP) .............................. 2002-007476

(51) Int. Cl.
*H04J 3/00* (2006.01)
(52) U.S. Cl. .................. 370/337; 455/452.2; 455/522; 455/69; 455/523; 370/252; 370/347; 370/328; 370/332; 370/333; 370/340
(58) Field of Classification Search ................ 370/337, 370/252, 347, 333, 229, 328; 455/450, 452.1, 455/452.2, 522, 523
See application file for complete search history.

(56) References Cited

U.S. PATENT DOCUMENTS 5,872,775 A * 2/1999 Saints et al. ................ 370/342
6,940,915 B2 * 9/2005 Tang .......................... 375/261
7,023,824 B2 * 4/2006 Khullar ....................... 370/337

* cited by examiner

*Primary Examiner*—Charles Appiah
*Assistant Examiner*—Randy Peaches
(74) *Attorney, Agent, or Firm*—Oblon, Spivak, McClelland, Maier & Neustadt, P.C.

(57) ABSTRACT

The present invention is to provide communication apparatus capable of selecting a transmission scheme suitable for a type of transmission information, its communication method, and programs. A transmitter/receiver portion 2 is capable of communicating under plural transmission schemes of different transmission rates in accordance with combinations of coding rates of a convolutional encoder and modulation schemes. A transmission scheme selection portion 5 prioritizes the transmission schemes in a plurality of different evaluation schemes in response to signal Ds representing the type of transmission information based on measurement results S4 measured at a measurement portion 4 and selects the optimum transmission scheme to be used for communications from the plural transmission schemes according to the prioritized result. The selected transmission scheme is sent to the transmitter/receiver portion 2 for switching the transmitter/receiver portion 2.

32 Claims, 16 Drawing Sheets

F I G. 4
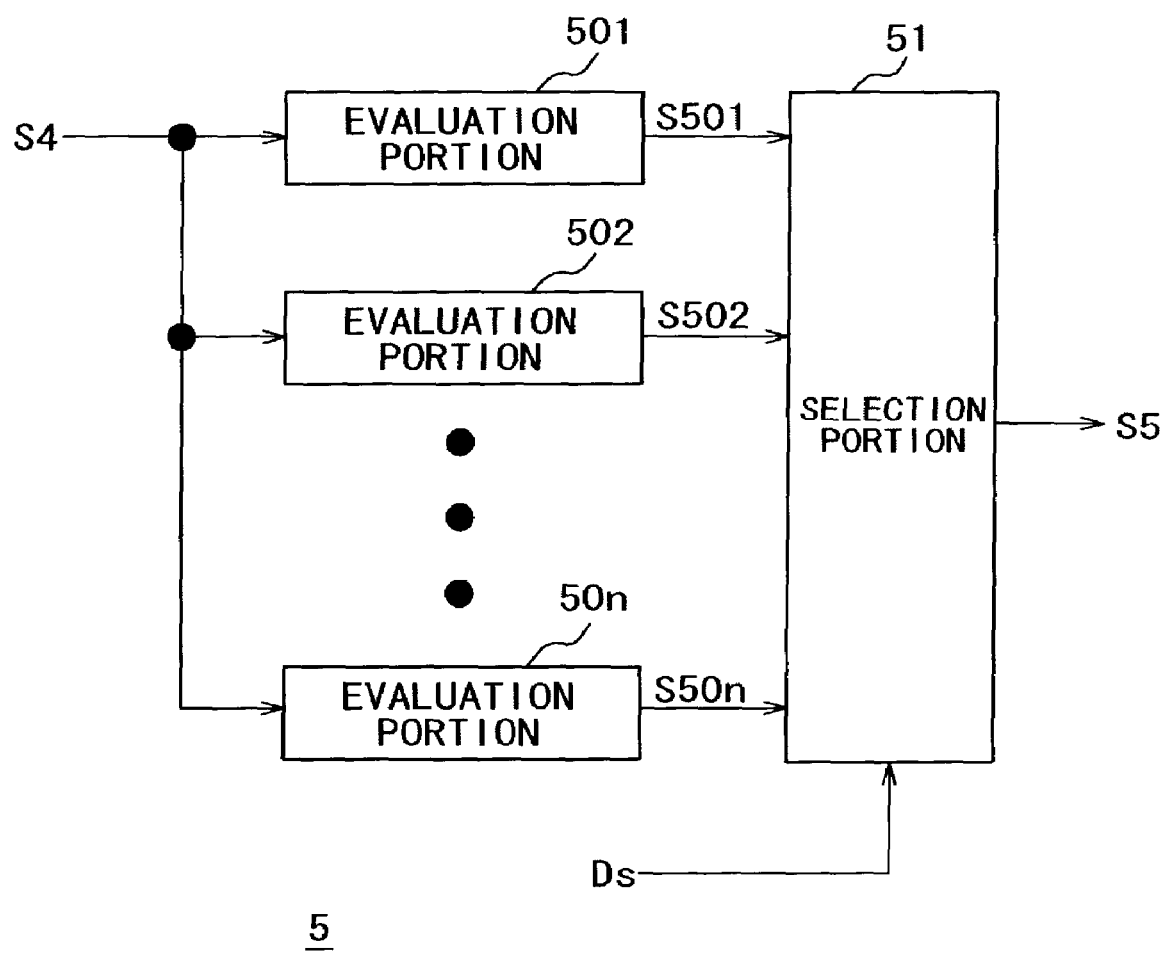

COMMUNICATION APPARATUS, METHOD AND PROGRAMS

CROSS REFERENCES TO RELATED APPLICATIONS

The present document is based on Japanese Priority Document JP 2002-007476, filed in the Japanese Patent Office on Jan. 16, 2002, the entire contents of which being incorporated herein by reference.

BACKGROUND OF THE INVENTION

1. Field of the Invention

The present invention relates to a communication apparatus, a communication method and programs, more specifically to a communication apparatus for performing communication using a transmission scheme that is selected from a plurality of preset transmission schemes, a communication method thereof and programs therefor.

2. Description of Related Art

A wireless communication apparatus tends to encounter higher data error rate as compared to a wired communication apparatus. In particular, throughput in a wireless communication varies largely depending on radio wave transmission environment such as multi-path, fading and the like. As a countermeasure, the wireless communication apparatuses to be used in, e.g., wireless LAN and the like are typically provided with means for improving communication quality by changing a transmission rate in response to switching of a coding rate in a convolutional encoder or a transmission scheme such as a modulation method and the like in a modulator.

In this case, manual switching of such transmission scheme by a user is very complicated and adversely affects its operability. It is therefore typical to provide means for automatically switching transmission schemes depending on communication conditions. Such technologies are commonly known as fall back, fall forward, rate adaptation, link adaptation, or the like.

FIG. 16 is a graph showing an example of such automatic switching of transmission schemes in accordance with the communication conditions. In FIG. 16, the vertical axis represents a transmission rate corresponding to transmission scheme 1 to transmission scheme 6 while the horizontal axis represents time. It should be noted that the ideal maximum transmission rates of the respective transmission schemes sequentially increase in the order of the transmission scheme 1 to the transmission scheme 6. In the particular example as shown in FIG. 16, the transmission schemes are switched to a lower maximum transmission rate at time t3 and time t6 while to a higher maximum transmission rate at time t4 and time t5.

As a criterion in making decision whether or not the transmission scheme should be automatically switched, it is typical to use a measurement result of one type of transmission path property. For example, if an error rate becomes lower than a predetermined threshold value, it can be assumed that radio wave transmission environment is in good condition. Accordingly, the transmission scheme is switched to that of a higher transmission rate in which the error rate may be slightly higher. On the other hand, if the error rate becomes higher than another threshold value, it can be assumed that the radio wave transmission condition is in poor condition. Accordingly, the transmission scheme is switched to that of a lower transmission rate in order to improve the error rate. In this manner, the transmission scheme is selected so as to obtain the highest transmission rate as possible with reducing the error rate at the same time.

SUMMARY OF THE INVENTION

Different transmission path properties are considered more important than the others depending on nature of information to be transmitted, e.g., information such as files that are simply transferred between computers and information such as contents communicated through Internet and having relatively large transmission delay time. Emphasis is placed on data transmission rate in the former case, while transmission delay time and its fluctuation are more important in the latter case.

As mentioned above, depending on the types of information to be transmitted, the priority is given to different transmission path properties. On the other hand, if the transmission path properties differ, different variation trends are observed in values measured in relation to transmission schemes.

FIG. 17 is a graph showing measurement values of the transmission path properties to different transmission schemes. In FIG. 17, the vertical axis represents measurement values of transmission path properties, while the horizontal axis represents schemes of the transmission used, i.e. the transmission scheme 1 to the transmission scheme 6. Measurement values having better communication quality are plotted upwardly along the vertical axis. In FIG. 17, curved line C1 represents throughput, while curved line C2 represents fluctuation of transmission delay time.

In the example as shown in FIG. 17, it is the transmission scheme 4 to provide the maximum throughput. However, fluctuation of transmission delay time sharply increases from the transmission scheme 4. Accordingly, the transmission scheme 4 is suitable for information such as the above mentioned broadcasting contents in which transmission rate is important but the transmission scheme 3 is preferable for information to be accessed through Internet.

However, since the switching of transmission schemes is carried out based on the fixed criterion of judgment in conventional communication apparatuses as described hereinabove, communication may be carried out under an improper transmission scheme depending on the type of information to be used, thereby resulting poor communication quality.

Furthermore, the optimum measurement condition for measuring transmission path properties may change for a different type of information to be transmitted. For example, in case of information for performing replay processing in a real time manner such as replaying of broadcasting contents, it is necessary to measure transmission path property (e.g., throughput) in a shorter interval as possible so that data depletion or overflow does not occur in receiver's buffers due to communication quality troubles or the like. On the contrary, in information of transient data transmission timing such as files transfer through Internet, it is preferable to use somewhat longer measurement period.

However, in conventional communication apparatuses, there encounters a problem such that the communication is carried out under an improper transmission scheme in some types of information since the transmission path properties are measured always under the constant condition regardless of the types of such information to be transmitted and the transmission scheme is determined in accordance with the measurement results.

The present invention is conceived in view of the above circumstances. It is desirable to provide a communication apparatus and a method capable of selecting an appropriate transmission scheme in accordance with the type of information being transmitted and/or information received. Furthermore, it is desirable to provide programs that realize such communication apparatus. Furthermore, it is desirable to provide a communication apparatus and a method capable of selecting a transmission scheme based on measurement results of the transmission path properties under an appropriate measurement condition that is determined in accordance with the type of information being transmitted and/or information received. Furthermore, it is desirable to provide programs that realize such communication apparatus.

According to a first aspect of the present invention, a communication apparatus is provided. The communication apparatus is an apparatus for communicating using a transmission scheme that is selected from a plurality of preset transmission schemes. The communication apparatus includes a measurement portion for measuring at least one of transmission path properties; and a transmission scheme selection portion for prioritizing the transmission schemes based on a measurement result of the transmission path property using different evaluation schemes for respective types of information being transmitted and/or information received (transmission information), and for selecting the transmission scheme transmission scheme to be used for communications from the plurality of transmission schemes based on a result of the prioritization.

In the present specification, information to be received and/or information received are referred to as the transmission information.

The transmission scheme selection portion may include a plurality of evaluation portions for prioritizing the transmission schemes based on the measurement result of the transmission path property by using respectively different evaluation schemes, and a selection portion for selecting the transmission scheme to be used for communications based on the prioritized result of the transmission schemes in the evaluation portion that is selected from the plurality of evaluation portion in accordance with the type of transmission information. Alternatively, the transmission scheme selection portion may include: a coefficient generation portion for generating coefficients of evaluation functions prescribed for the respective transmission schemes in accordance with the type of transmission information; a calculation portion for calculating the evaluation function values with generated coefficients for the respective transmission schemes using the measurement value of the transmission path property as a variable; and a selection portion for comparing the evaluation function values calculated in the calculation portion for the respective transmission schemes and for selecting the transmission scheme to be used for communications in accordance with the comparison result.

According to the first aspect of the communication apparatus of the present invention, in the transmission scheme selection portion, different evaluation schemes are used for the respective types of transmission information and the transmission schemes are prioritized based on the measurement results of the measurement portion. The transmission scheme to be used for communications is selected from the plurality of transmission schemes in accordance with the prioritized result. For example, in the selection portion, the evaluation portion are selected in accordance with the type of transmission information and the transmission scheme to be used for communications is selected based on the prioritized results of the transmission schemes in the selected evaluation portion. Furthermore, for example, in the calculation portion, the evaluation function values in the coefficients generated in accordance with the type of transmission information are calculated for the respective transmission schemes by using the measurement value of the transmission path property as a variable. The calculated evaluation function values are compared to one another in the selection portion for selecting the transmission scheme to be used for communications in accordance with the comparison result.

A communication apparatus in a second aspect of the present invention is a communication apparatus for communications by using a transmission scheme that is selected from a plurality of preset transmission schemes. The communication apparatus includes: a measurement portion for measuring at least one of transmission path properties under a measurement condition; a measurement condition setting portion for setting a measurement condition in the measurement portion for respective transmission path property in accordance with the type of transmission information; and a transmission scheme selection portion for prioritizing the transmission schemes based on a measurement result of the transmission path property for selecting the transmission scheme to be used for communicationss from the plurality of transmission schemes in accordance with the prioritized result.

According to the second aspect of the communication apparatus of the present invention, in the measurement condition setting portion, the measurement conditions for the respective transmission path properties are set in accordance with the type of transmission information and the measurements of the transmission path properties in the measurement portion are made under the measurement conditions. In the transmission scheme selection portion, the transmission schemes are prioritized based on the measurement results in the measurement portion and the transmission scheme to be used for communications is selected from the plurality of transmission schemes in accordance with the prioritized result.

A communication method according to a third aspect of the present invention is a communication method for communicating using a transmission scheme that is selected from a plurality of preset transmission schemes. The communication method includes the steps of: measuring at least one of transmission path properties, prioritizing the transmission schemes based on a measurement result of the transmission path property by using different evaluation schemes for respective types of transmission information; and selecting the transmission scheme to be use for communication from the plurality of transmission schemes in accordance with the prioritized result.

A communication method according to a fourth aspect of the present invention is a communication method for communicating by using a transmission scheme that is selected from a plurality of preset transmission schemes. The communication method includes the steps of setting measurement conditions for measuring at least one transmission path properties in accordance with the type of transmission information; measuring the transmission path property under the set measurement condition; prioritizing the transmission schemes based on the measurement result of the transmission path property; and selecting the transmission schemes to be used for communications from the plurality of transmission schemes in accordance with the prioritized result.

A program according to a fifth aspect of the present invention is to have a communication apparatus for communications by using a transmission scheme that is selected from a plurality of preset transmission schemes to execute processing. The processing includes a first step for measuring at least one transmission path properties; a second step for prioritizing the transmission schemes based on the measurement results using different evaluation schemes for the respective types of transmission information; and a third step for selecting the transmission scheme to be used for communications from the plurality of transmission schemes in accordance with the prioritized result.

A program according to a sixth aspect of the present invention is to have a communication apparatus for communications by using a transmission scheme that is selected from a plurality of preset transmission schemes to execute processing. The processing, includes a first step of setting measurement conditions for measuring at least one transmission path properties in accordance with the type of transmission information; a second step for measuring the transmission path property under the measurement condition set; a third step for prioritizing the transmission schemes based on a measurement result of the transmission path property; and a fourth step of selecting the transmission scheme to be used for communications from the plurality of transmission schemes in accordance with the prioritized result.

According to the present invention, there are following advantages over the conventional technologies. Firstly, it is possible to select appropriate transmission scheme in accordance with the type of transmission information. Secondary, it is possible to selects the transmission scheme based on the measurement results of transmission path properties as measured under appropriate measurement conditions in accordance with the type of transmission information.

BRIEF DESCRIPTION OF DRAWINGS

The above and other objects, features and advantages of the present invention will become more apparent from the following description of the presently preferred exemplary embodiment of the invention taken in conjunction with the accompanying drawings, in which:

FIG. 4 is a schematic block diagram showing an exemplified construction of the transmission scheme selection portion;

DESCRIPTION OF PREFERRED EMBODIMENTS

Now, two embodiments of the present invention will be described hereunder with reference to the accompanying drawings.

(First Embodiment)

Figure 1:
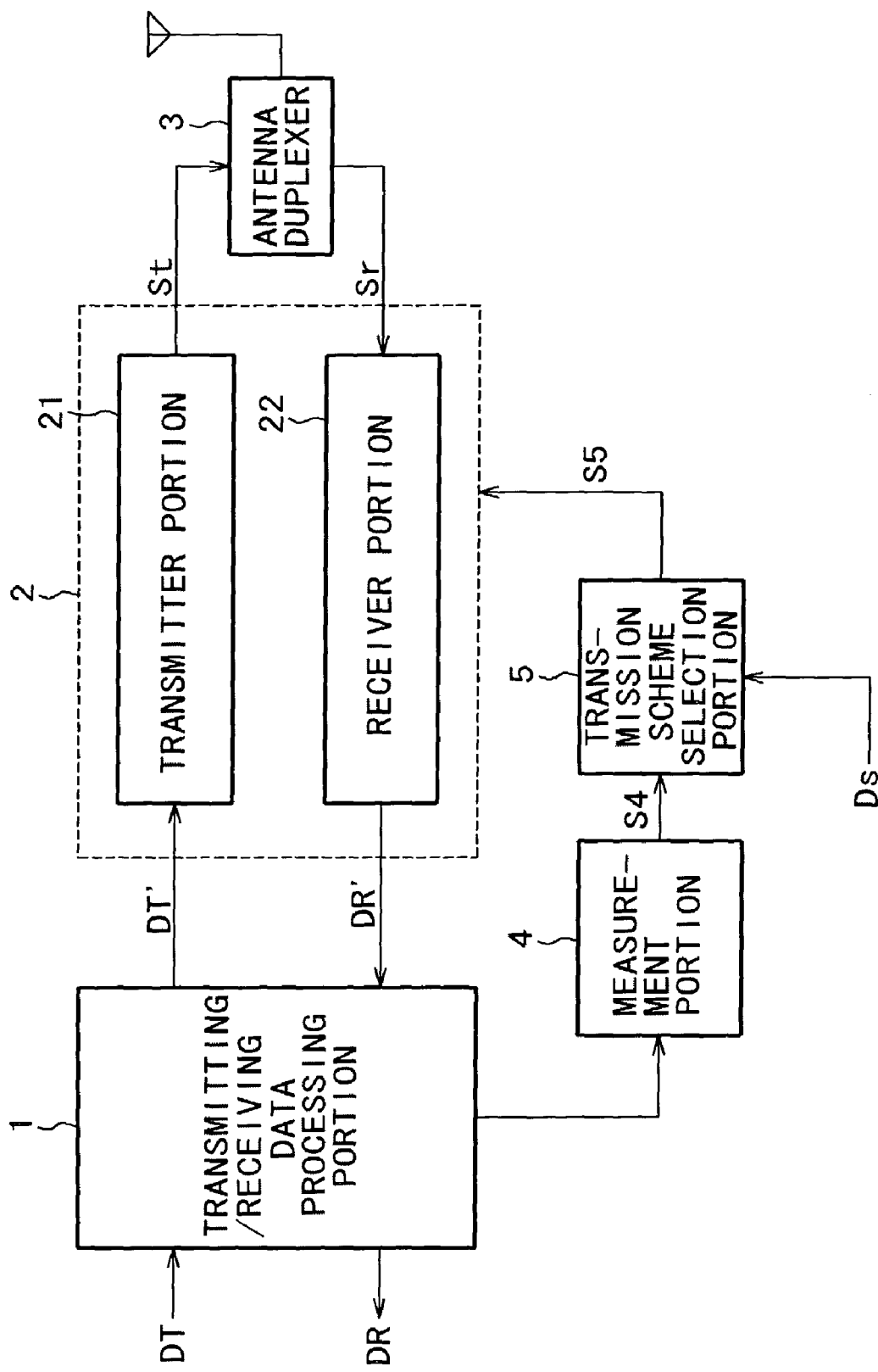
FIG. 1 is a schematic block diagram showing an exemplified construction of the communication apparatus according to a first embodiment of the present invention.

FIG. 1 is a schematic block diagram illustrating an exemplified construction of a communication apparatus according to the first embodiment of the present invention. The communication apparatus as shown in FIG. 1 includes a transmitting/received data processing portion 1, a transmitter/receiver portion 2, an antenna duplexer 3 and a transmission scheme selection portion 5.

The transmitting/received data processing portion 1 performs processing of supplied transmitting information DT to generate transmission data DT' in a packet format by adding information such as destination and sender's device addresses, ECC (error correcting code), etc, like in a MAC (Media Access Control) processing. Furthermore, the transmitting/received data processing portion 1 examines received data DR' supplied from the transmitter/receiver portion 2, extracts packets that indicate the same device address as its own device address, and reproduces received information DR by performing error detection/correction processing if ECC is added therein.

A transmitter portion 21 in the transmitter/receiver portion 2 performs predetermined encoding processing and modulation processing on the transmission data DT' that is outputted from the transmitter/receiver portion 1, thereby generating a transmission signal St. Furthermore, in a receiver portion 22, predetermined demodulation processing and decoding processing are performed on a received signal Sr that is outputted from the antenna duplexer 3, thereby generating a received data DR'. In the present embodiment, it is possible to transmit and receive data with a plurality of different transmission schemes. Data is transmitted and/or received using a transmission scheme that is designated by a signal S5 outputted from the transmission scheme selection portion 5 among the plurality of transmission schemes.

Figure 2:
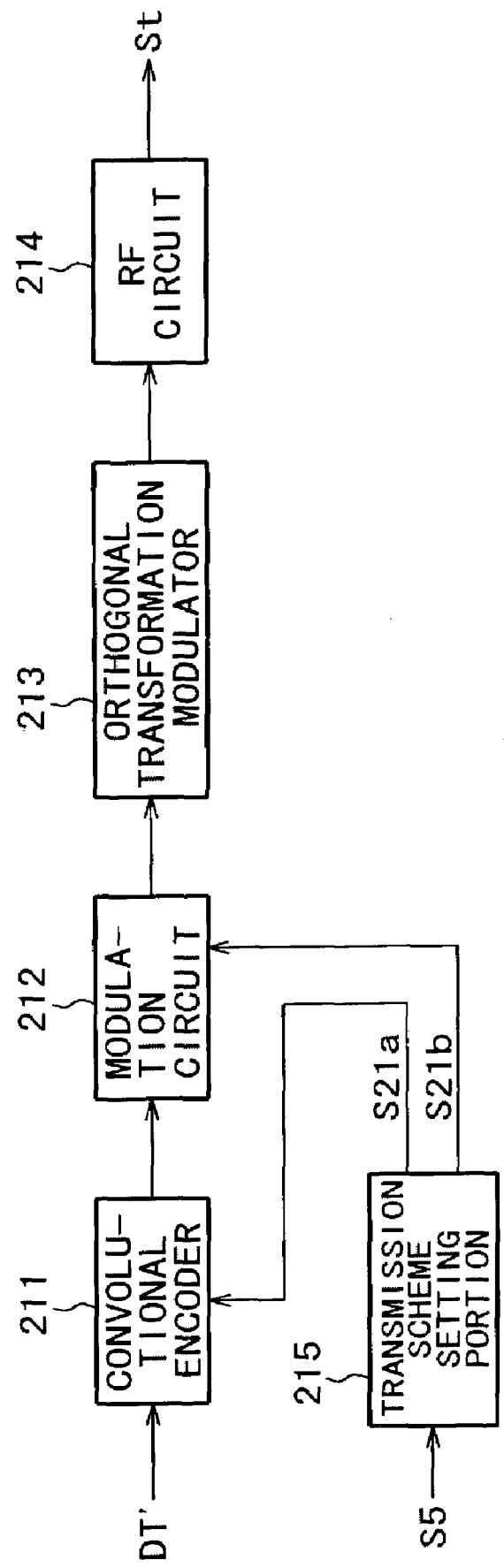
FIG. 2 is a schematic block diagram showing an exemplified construction of the transmitter portion in FIG. 1.

Below, an example of more detailed construction of each of the above mentioned transmitter portion 21 and the receiver portion 22 is described. FIG. 2 is a schematic block diagram showing an exemplified construction of the transmitter portion 21 in FIG. 1. The transmitter portion 21 as shown in FIG.

2 includes a convolutional encoder 211, a modulation circuit 212, an orthogonal modulator 213, an RF circuit 214 and a transmission scheme setting portion 215.

The convolutional encoder 211 performs convolutional encoding of the transmission data DT' using a coding rate set by a setting signal S21a outputted from the transmission scheme setting portion 215. The modulation circuit 212 modulates the received data that is convolutional encoded using the modulation scheme set by a setting signal S21b outputted from the transmission scheme setting portion 215. Table 1 as shown below is one example of the maximum transmission rate, the modulation scheme and the coding rate to be set for each of the transmission schemes.

TABLE 1

| Rate (Mbps) | Modulation Scheme | Coding Rate |
|---|---|---|
| 6 | BPSK | 1/2 |
| 9 | BPSK | 3/4 |
| 12 | QPSK | 1/2 |
| 18 | QPSK | 3/4 |
| 24 | 16 QAM | 1/2 |
| 36 | 16 QAM | 3/4 |
| 48 | 64 QAM | 2/3 |
| 54 | 64 QAM | 3/4 |

In the example as shown in Table 1, there are shown eight types of transmission schemes in association with combinations of coding rates of convolutional encoder and modulation schemes. That is, in a transmission scheme of the maximum transmission rate equal to 6 Mbps, the modulation scheme is set to BPSK (Binary Phase Shift Keying) and the coding rate is set to ½. In a transmission scheme of the maximum transmission rate equal to 9 Mbps, the modulation scheme is set to BPSK and the coding rate is set to ¾. In a transmission scheme of the maximum transmission rate equal to 12 Mbps, the modulation scheme is set to QPSK (Quadrature Phase Shift Keying) and the coding rate is set to ½. In a transmission scheme of the maximum transmission rate equal to 18 Mbps, the modulation scheme is set to QPSK and the coding rate is set to ¾. In a transmission scheme of the maximum transmission rate equal to 24 Mbps, the modulation scheme is set to 16QAM (16 Quadrature Amplitude Modulation) and the coding rate is set to ½. In a transmission scheme of the maximum transmission rate of 36 Mbps, the modulation scheme is set to 16QAM and the coding rate is set to ¾. In a transmission scheme of the maximum transmission rate equal to 48 Mbps, the transmission scheme is set to 64QAM and the coding rate is ⅔. In a transmission scheme of the maximum transmission rate equal to 54 Mbps, the modulation scheme is set to 64QAM and the coding rate is set to ¾.

The orthogonal modulator 213 performs orthogonal modulation of a carrier signal having a predetermined intermediate frequency and a modulation signal outputted from the modulation circuit 212, thereby up-converting the modulation signal to a high frequency in the intermediate frequency band. The RF circuit 214 performs high frequency signal processing such as filtering, amplifying and the like on the high frequency signal in the intermediate frequency band up-converted by the orthogonal modulator 213, thereby generating a transmission signal St.

The transmission scheme setting portion 215 outputs a signal, which sets the coding rate and the modulation scheme, e.g., as shown in Table 1 in response to a transmission scheme designation signal S5 outputted from the transmission scheme selection portion 5, to the convolutional encoder 211 and the modulation circuit 212.

According to the transmitter portion 21 of the above mentioned construction, the coding rate setting signal S21a and the modulation scheme setting signal S21b are generated in response to the signal S5 from the transmission scheme selection portion 5, thereby setting the coding rate of the convolutional encoder 211 and the modulation scheme of the modulation circuit 212 in response to the above signals. The transmission data DT' to be inputted to the convolutional encoder 211 is convolution encoded at the coding rate set thereby before being modulated in the modulation circuit 212 by the modulation scheme set thereby. Additionally, the modulation signal is converted into the intermediate frequency by the orthogonal modulator 213 and performed high frequency signal processing such as filtering, amplifying and the like in the RF circuit 214, thereby being outputted as the transmission signal St.

Figure 3:
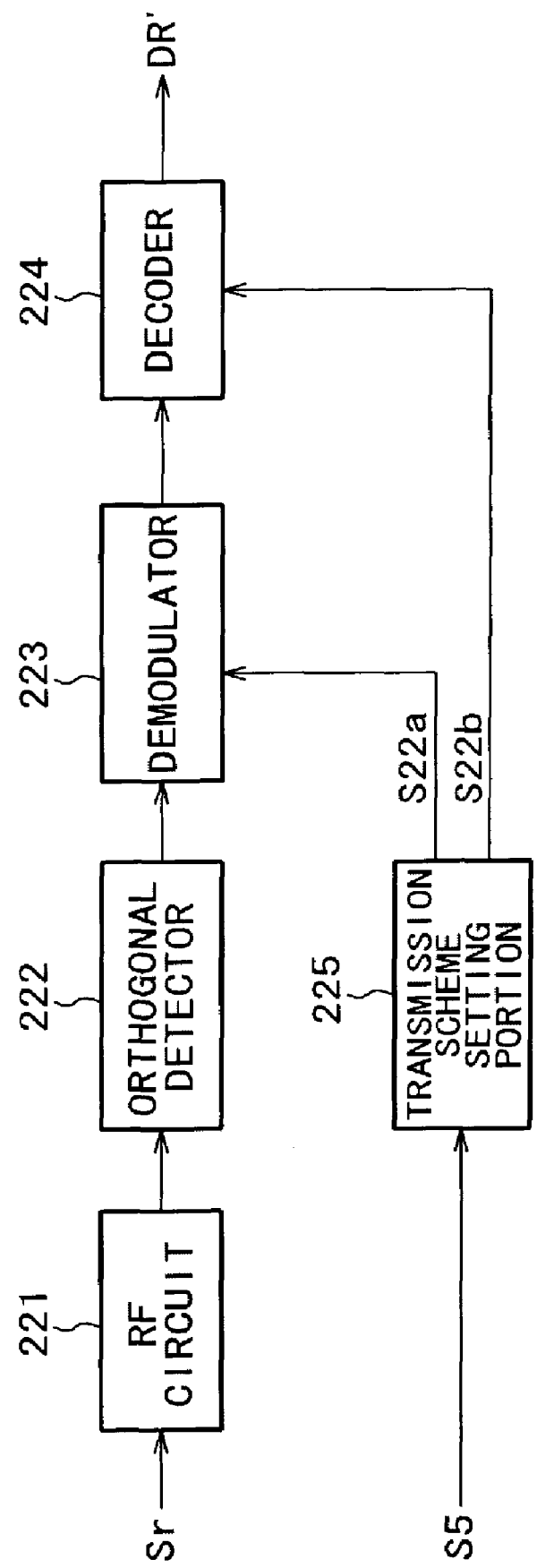
FIG. 3 is a block diagram of an exemplified construction of the receiver portion in FIG. 1.

FIG. 3 is a schematic block diagram showing an exemplified construction of the receiver portion 22 in FIG. 1. The receiver portion 22 as shown in FIG. 3 includes an RF circuit 221, an orthogonal detector 222, a demodulation circuit 223, a decoder 224 and a transmission scheme setting portion 225.

The RF circuit 221 performs high frequency processing such as filtering, amplifying and the like on the signal from the RF circuit 221. The orthogonal detector 222 performs orthogonal detection of signals from the RF circuit 221 and the carrier signal of the intermediate frequency, thereby converting the signal in the intermediate frequency band into the base band signal.

The demodulation circuit 223 uses the demodulation scheme set by a setting signal S22a outputted from the transmission scheme setting portion 225 to demodulate the base band signal that is outputted from the orthogonal detector 222. The decoder 224 sets demodulation algorithm in, e.g., viterbi decoding or the like in response to the coding rate set by a setting signal S22b outputted from the transmission scheme setting portion 225, thereby decoding the demodulated signal that is outputted from the demodulation circuit 223.

According to the receiver portion 22 of the above construction, the modulation scheme setting signal S22a and the coding rate setting signal S22b are generated in response to the signal S5 from the transmission scheme selection portion 5, thereby setting the demodulation scheme of the demodulation circuit 223 and decoding algorithm of the decoder 224 in response thereto. The received signal Sr inputted to the RF circuit 221 undergoes high frequency processing such as filtering, amplifying and the like. Subsequently, it is converted into the base band signal from the intermediate frequency band signal in the demodulation circuit 223. Furthermore, it is demodulated by the modulation scheme in response to the setting signal S22a in the demodulation circuit 223 and the demodulated signal is then decoded to a decoding algorithm in response to the setting signal S22b in the decoder 224, thereby being outputted as the received data DR'. The foregoing is the description of the transmitter portion 21 and the receiver portion 22.

Returning to FIG. 1, the antenna duplexer 3 is a block enabling sharing of a single antenna by the transmitter portion 21 and the receiver portion 22, and supplies the transmission signal St outputted from the transmitter portion 21 to the antenna and also picks up the received signal Sr from the antenna to be supplied to the receiver portion 22.

The measurement portion 4 monitors the data processed in the transmitting/received data processing portion 1 and measures transmission path properties such as, e.g., a maximum data transmission rate, average transmission rate, temporal fluctuation of the transmission delay time, error rate and the like. Although not shown in FIG. 1, it is possible to measure, e.g., received signal intensity, decoding error rate in the decoder 224 and the like by monitoring signals of various parts in the transmitter/receiver portion 2.

The transmission scheme selection portion 5 prioritizes the transmission schemes using the evaluation scheme in response to the signal Ds, which indicates the type of transmission information, and selects the transmission scheme to be used for transmitting/received data by the transmitter/receiver portion 2 from a plurality of the transmission schemes based on the result of the prioritization. At this time, a measurement result S4 from the measurement portion 4 is used as an evaluation reference for the prioritization.

Now, an example of more detailed construction of the above mentioned transmission scheme selection portion 5 is described. FIG. 4 is a schematic block diagram of an exemplified construction of the transmission scheme selection portion 5. The transmission scheme selection portion 5 as shown in FIG. 4 includes n (where, n is an arbitrary integer) evaluation portions 501 to 50$n$ and a selection portion 51.

The evaluation portions 501 to 50$n$ prioritize the transmission schemes based on the measurement result S4 in the measurement portion 4 using different evaluation schemes. The selection portion 51 selects the evaluation portion from the evaluation portions 501 to 50$n$ in response to the signal Ds designating the type of transmission information, and selects the transmission scheme to be used for communications based on a result of the prioritization in the selected transmission scheme, thereby outputting the designation signal S5 for designating the selected transmission scheme.

An example of a further detailed construction of the evaluation portions 501 to 50$n$ is described with reference to FIG. 5, which is a schematic block diagram of an exemplified construction of the evaluation portion 50$m$ (where, m is an arbitrary integer). The evaluation portion 50$m$ in FIG. 5 includes evaluation value calculation portions 5001 to 500$k$ corresponding to k (where, k is an arbitrary integer) transmission schemes and an evaluation value selection portion 501.

The evaluation value calculation portions 5001 to 500$k$ are blocks provided for respective transmission schemes and calculate evaluation function values respectively determined by using the measurement values of the transmission path properties as variables.

Although the evaluation functions can be defined arbitrarily, it is possible to calculate the evaluation values by weighting the measurement values of the transmission path properties with predetermined weighting coefficients for respective evaluation value calculation portions before combining the weighted measurement values. For example, normalized measurement values of maximum transmission rate "ms", average transmission rate "as", temporal fluctuation of the transmission rate "ds", transmission delay time "d", temporal fluctuation of transmission delay time "dd" and error rate "e" are used as variables, and the evaluation function F can be defined by the following equation:

(Equation 1)

$$F = a1 \times ms + a2 \times as + a3 \times ds + a4 \times d + a5 \times dd + a6 \times e \quad (1)$$

It should be noted that symbols a1 to a6 represent weighting coefficients.

The evaluation value calculation portions 5001 to 500$k$ for respective transmission schemes have respectively predetermined weighting coefficients, each of which is determined for respective evaluation portions. As a result, even in the evaluation value calculation portion for the same transmission scheme, it is possible to have different weighting coefficients depending on the difference of the evaluation portions (i.e., difference in the evaluation schemes).

Furthermore, the weighting coefficient values are properly determined in accordance with the types of transmission information. For example, the weighting coefficients a1 and a2 are set to larger than the other weighting coefficients for such information as files that are to be transferred between computers, and in which the emphasis is placed on high transmission rate. A larger weighting coefficient a4 is set for such information as broadcasting contents in which the emphasis is placed on real time performance. The weighting coefficients a5 and a6 are set to larger values for such transmission information through Internet in which fluctuation in delay time is critical. A larger weighting coefficient a6 is set for such information as packets in UDP (User Datagram Protocol) in which no resending is carried out and thus the emphasis is placed on error rate.

Larger weighting coefficients a2 and a5 are set in case of transmitting such information as recorded moving images in which fluctuation in delay time is permitted by having the receiver buffer to a certain extent but relatively high transmission rate is required.

Alternatively, the method for normalizing the measurement values may be changed in accordance with the measurement results S4 depending on the type of transmission information. For example, if the measured transmission rate is less than 2.6 Mbps for such information that is required to be transmitted at 2.6 Mbps or higher transmission rate, it is possible to set a range of the normalized measurement between 0 to 1 and the value for the maximum transmission rate "ms" to 0, while the value for the maximum transmission rate "ms" is set to the maximum value 1 in case when the measured transmission reaches 2.6 Mbps. In this manner, whether or not the measured transmission rate condition is reached to 2.6 Mbps is strongly reflected in the values of the evaluation function F.

Although the evaluation function is defined using the measurement results of plural types of transmission path properties as variables in the above example, if only one type of the transmission path property is available, it is possible to use the one measurement value with different weightings for respective transmission schemes as the evaluation function values.

The foregoing is the description of the evaluation value calculation portions 5001 to 500$k$ in case of the example using the evaluation function of Equation (1).

The evaluation value selection portion 501 compares the evaluation values of the evaluation value calculation portions 5001 to 500$k$ as calculated based on the evaluation function, e.g., as shown in Equation (1) and prioritizes the transmission schemes in response to the comparison results. And the transmission scheme of the highest priority is selected and a signal for designating such transmission scheme is outputted.

Figure 5:
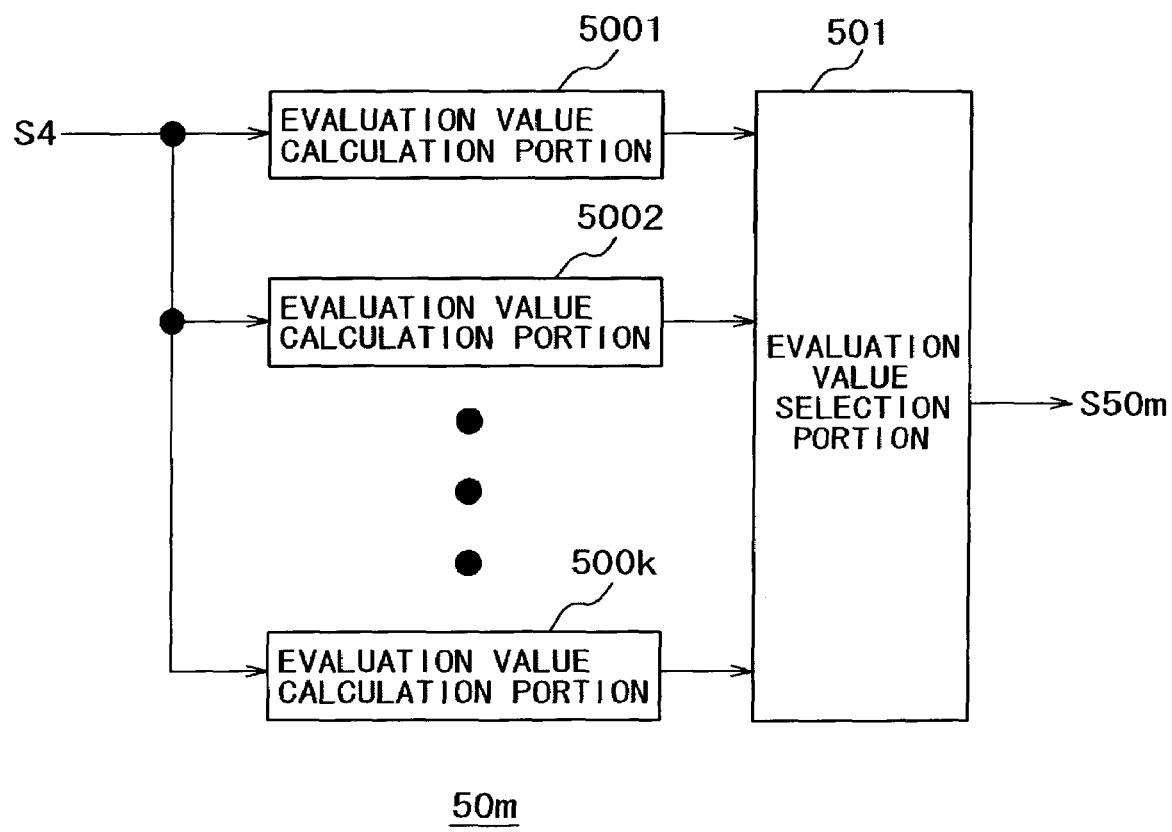
FIG. 5 is a schematic block diagram showing an exemplified construction of the evaluation portion.

According to the transmission scheme selection portion 5 of the construction as shown in FIG. 4 and FIG. 5, evaluation function values determined for respective transmission schemes are calculated by the evaluation value calculation portions 5001 to 500$k$ in the respective evaluation portions using the measurement results S4 of the transmission path properties as variables. The calculated evaluation values are compared to one another in the evaluation value selection portion 501 for prioritizing the transmission schemes based on the comparison results. Then, the evaluation values are selected in accordance with the priority order from the plurality of evaluation values. In this manner, the selection portion 51 selects the transmission scheme of the evaluation portion corresponding to respective types of transmission information as the transmission scheme to be used for communications from the transmission schemes selected as prioritizing results of the respective evaluation portions. Finally, the signal S5 is generated to designate the transmission scheme.

In the above described transmission scheme selection portion 5, although the transmission schemes of the evaluation portions are selected in accordance with the type of transmission information by the selection portion 51 from the transmission schemes selected in advance by the respective evaluation portions. Alternatively, such sequence of the procedures may be changed or reversed. In other words, at the first step, the selection of the evaluation portions may be made in response to the signal Ds that designates the type of transmission information, and then the signal S5 is generated based on the selection result of the transmission scheme made by the selected evaluation portion.

Figure 6:
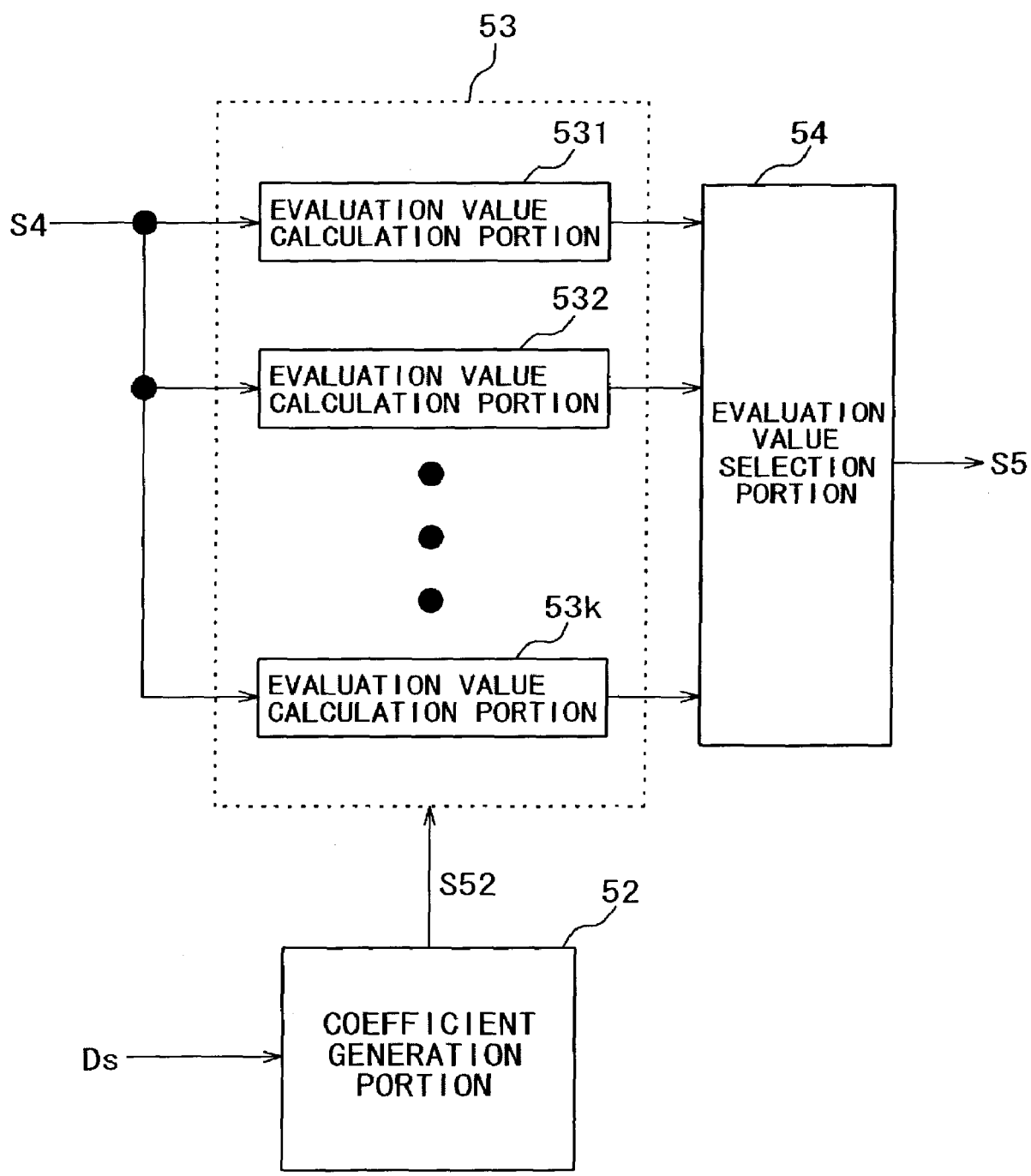
FIG. 6 is a schematic block diagram showing another exemplified construction of the transmission scheme selection portion.

Furthermore, in the above described transmission scheme selection portion 5, the plurality of evaluation value calculation portions corresponding to a plurality of transmission schemes are provided separately in the respective evaluation portions. However, the transmission scheme selection portion 5 may be constructed as shown in FIG. 6 in case of using the same evaluation function for the same transmission scheme but different only in the coefficients even if different evaluation schemes are employed. FIG. 6 is a schematic block diagram showing another exemplified construction of the transmission scheme selection portion 5. The transmission scheme selection portion as shown in FIG. 6 includes a coefficient generation portion 52, a calculation portion 53 and an evaluation value selection portion 54.

The coefficient generation portion 52 generates coefficients S52 for the evaluation functions that are set for respective transmission schemes in response to the signal Ds that designates the type of transmission information.

The calculation portion 53 calculates the evaluation values in the coefficient generated by the coefficient generation portion 52 using the measurement values S4 of the transmission path properties as variables for respective transmission schemes. As shown in FIG. 6, there are evaluation value calculation portions 531 to 53$k$ corresponding to respective transmission schemes and an evaluation function, e.g., as shown in Equation (1) is defined for each evaluation value calculation portion. Finally, the evaluation function values for the generated coefficient S52 are calculated using the measurement values S4 of transmission path properties as variables.

The evaluation value selection portion 54 compares the evaluation function values calculated for respective transmission schemes in the calculation portion 53 and selects the transmission scheme to be used for communications in response to the comparison result.

According to the transmission scheme selection portion 5 of the construction as shown in FIG. 6, the coefficients S52 for the evaluation functions that are set for respective transmission schemes are generated by the coefficient generation portion 52 in response to the signal Ds that designates the type of transmission information. Each evaluation function value of the evaluation value calculation portions 531 to 53$k$ is calculated using the coefficients S52 that are generated using the measurement values S4 of the transmission path properties as variables. The calculated evaluation function values are compared to one another by the evaluation value selection portion for selecting the transmission scheme to be used for communications in response to the comparison result.

As apparent from comparison of the constructions in FIG. 4 and FIG. 5, according to the construction as shown in FIG. 6, there is no need for providing the evaluation value calculation portions equal to the number of transmission schemes for each different evaluation scheme by utilizing the common evaluation value calculation portion in each evaluation scheme, thereby simplifying the construction. The foregoing is the description of the transmission scheme selection portion 5 in FIG. 1.

Below, operations for selecting the transmission schemes in the communication apparatus in FIG. 1 having the above described construction is explained with reference to a flowchart shown in FIG. 7.

Step ST101:

The type of transmission information is set in the transmission scheme selection portion 5 using the signal Ds. There are, e.g., three different methods as shown in FIG. 8 to FIG. 10 used for designating the type of transmission information in the transmission scheme selection portion 5.

Figure 8:
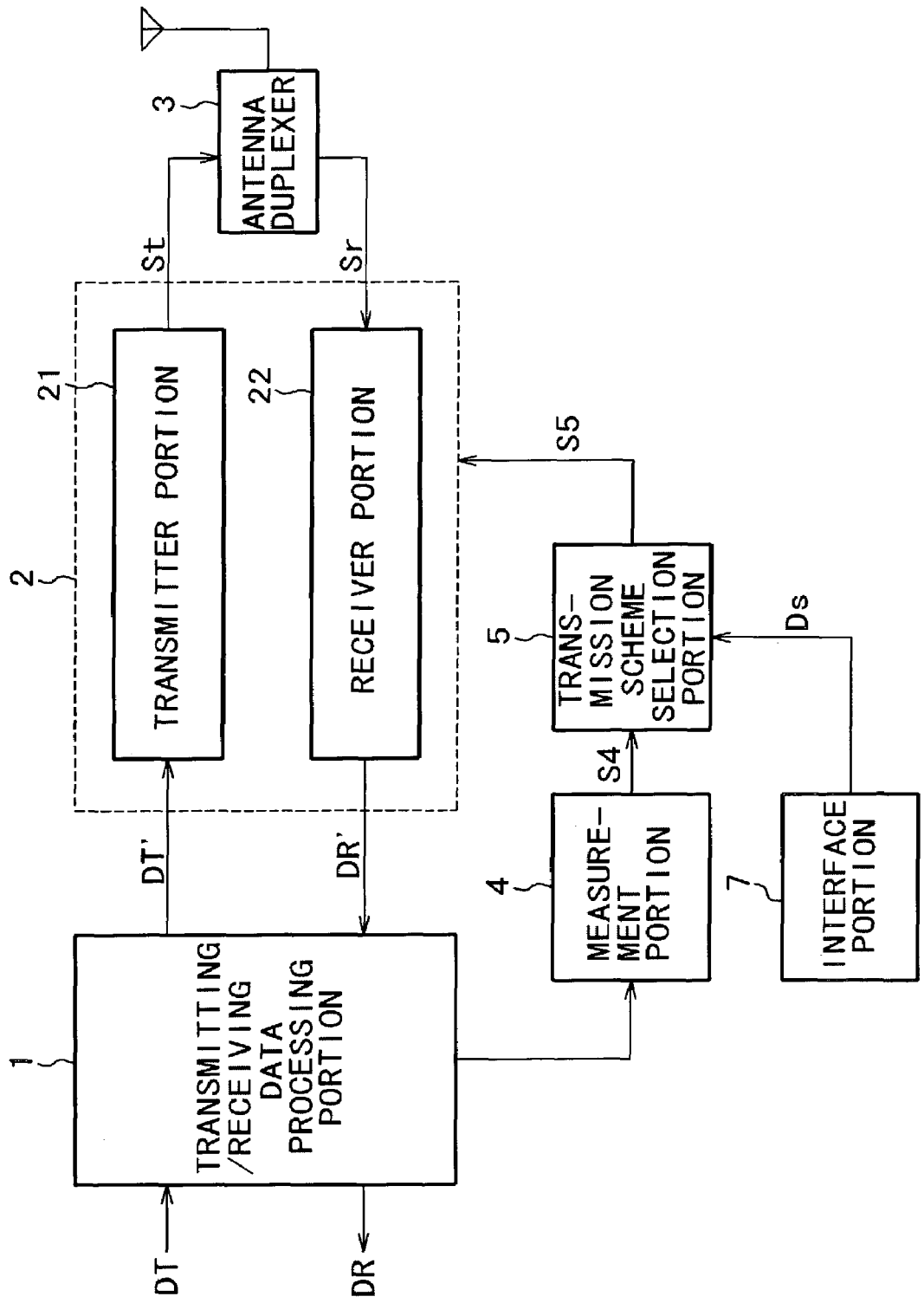
FIG. 8 is a block diagram showing an exemplified construction in case of designating types of transmission information using an interface portion in the communication apparatus in FIG. 1.

FIG. 8 is a schematic block diagram showing an exemplified construction of the communication apparatus in case of designating the type of transmission information by the use of an interface portion. It should be noted that the same reference numerals as those in FIG. 1 represent the same constituting elements. In FIG. 8, the interface portion 7 generates the signal Ds for designates the type of transmission information in response to a predetermined input operation to various information input devices such as, e.g., a mouse, a keyboard, switches and the like. Provision of such interface portion 7 enables a user to arbitrarily set the type of transmission information.

Figure 9:
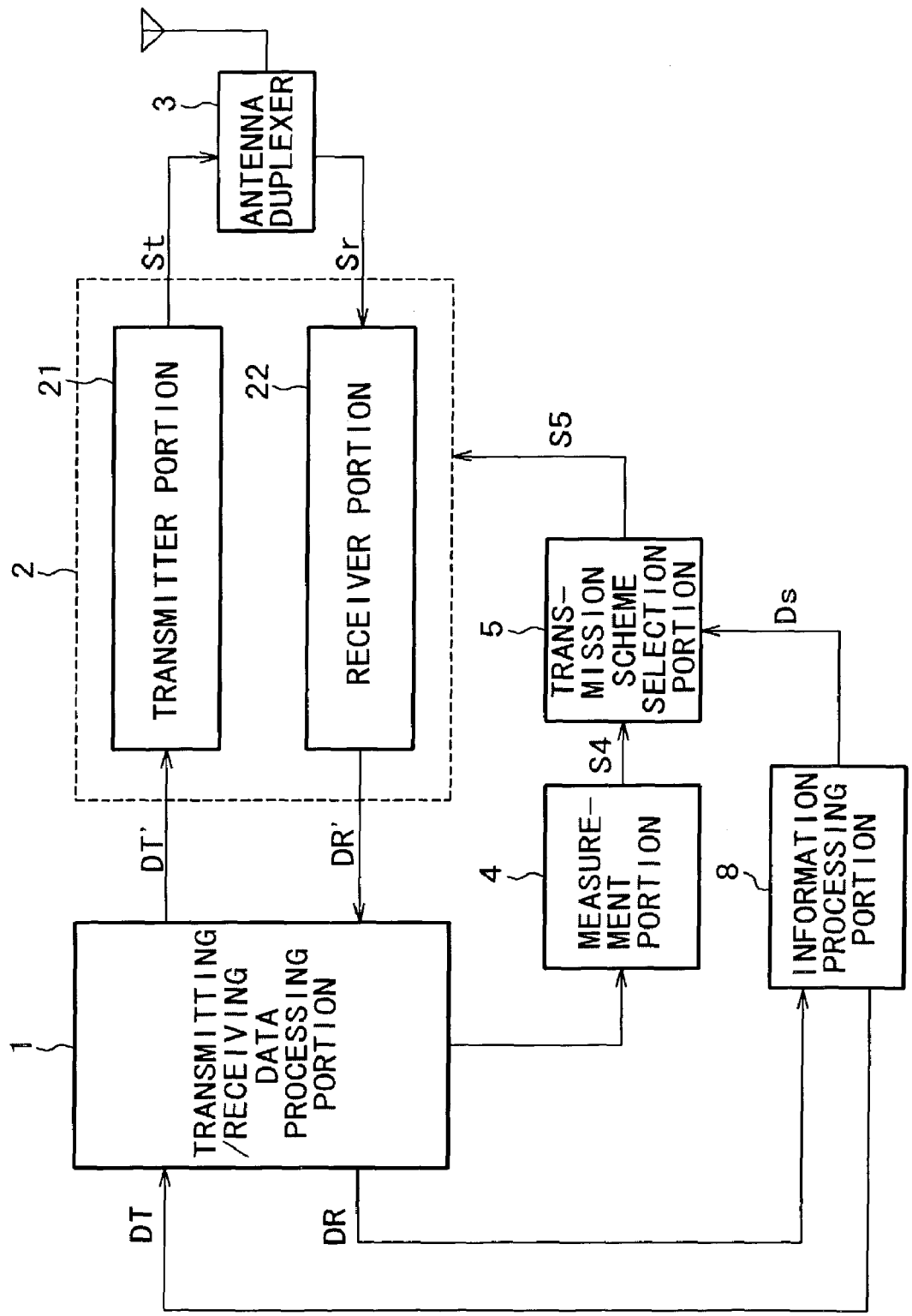
FIG. 9 is a schematic block diagram showing an exemplified construction to designate types of transmission information using an information processing portion in the communication apparatus in FIG. 1.

FIG. 9 is a schematic block diagram showing an exemplified construction of the communication apparatus in case of designating the type of transmission information using an information processing portion. Again, the same reference numerals as those in FIG. 1 represent the same constituent elements. In FIG. 9, the information processing portion 8 is a block for generating the transmission information DT or to process the received information DR, which corresponds to, e.g., a processing device of application programs for transmitting and received information by the use of the communication apparatus. The type of transmission information notified from the information processing portion 8 is set at the transmission scheme selection portion 5. In the exemplified construction in FIG. 9, it is possible to automatically set the type of transmission information. Furthermore, since the type of transmission information is set in response to the signal Ds from the information processing portion 7 that actually generates or processes the transmitting or received information, it is possible to set the type of transmission information more reliably as compared to the manual setting by the user as shown in FIG. 8.

Figure 10:
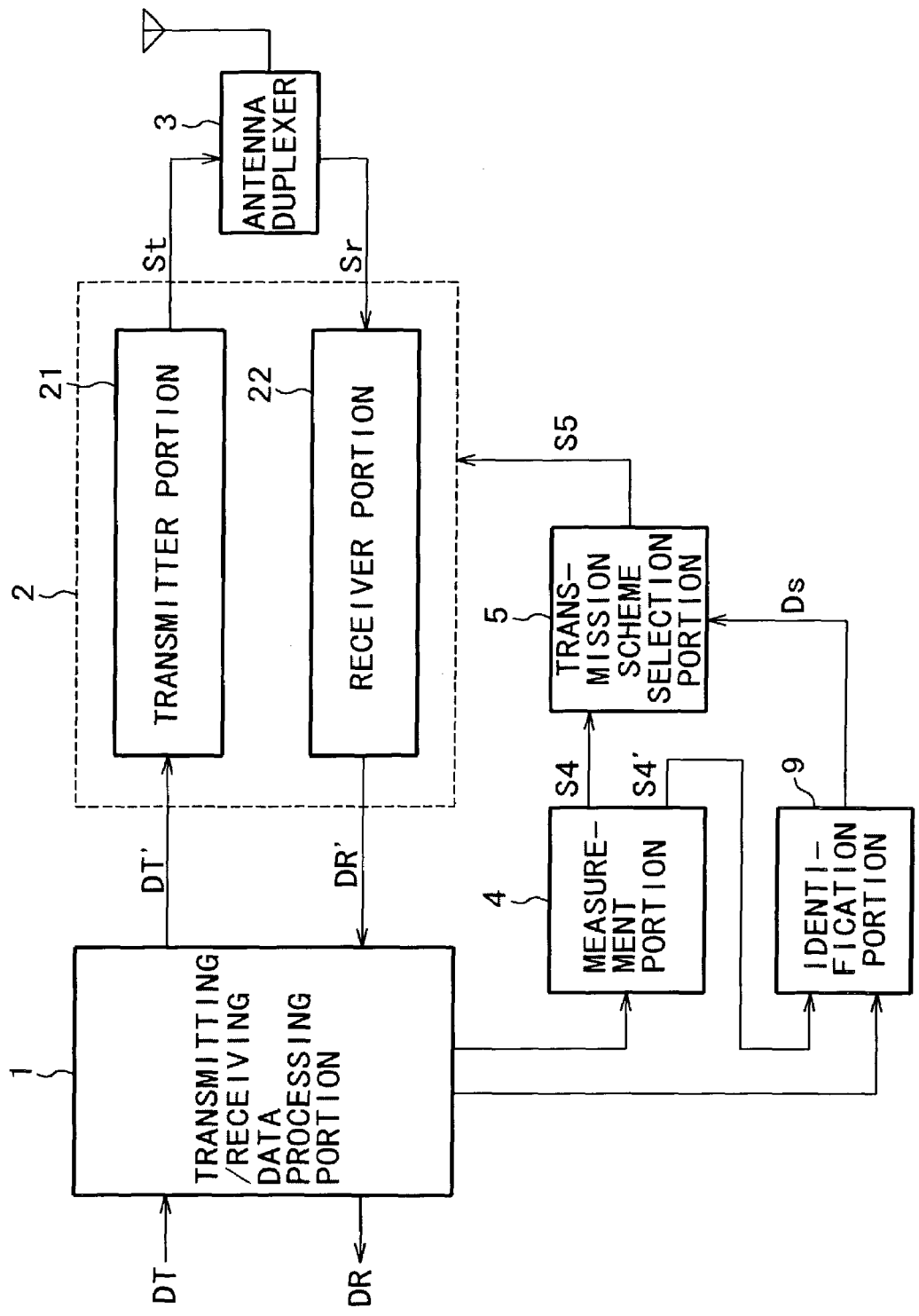
FIG. 10 is a schematic block diagram showing an exemplified construction to designate types of transmission information using an identification portion of the communication apparatus in FIG. 1.

FIG. 10 is a schematic block diagram showing an exemplified construction of the communication apparatus in case of designating the type of transmission information by the use of an identification portion. In FIG. 10, the same reference numerals as those in FIG. 1 represent the identical constituent elements. In FIG. 10, the identification portion 9 identifies the type of transmission information based on results of analysis of the contents of information being transmitted or received in the transmitting/received data processing portion 1, measurement results of certain transmission path properties by the measurement portion 4 and the like. The type of transmission information as identified in the identification portion 9 is set in the transmission scheme selection portion 5.

For example, by analyzing certain information contained in data packets to be transmitted or received, it is possible to specify the type of packet (TCP, UDP, etc.). It is also possible to specify the type of files (MPEG, JPEG, etc.) by analyzing header information of the files.

By examining temporal fluctuation in the measured transmission rate, it is also possible to identify if it is streaming data such as moving picture images of relatively constant transmission rate. Additionally, by examining the measured transmission delay time, it is possible to identify if it is information accessed through a wide area network such as Internet and the like or if it is information accessed through a narrow network such as LAN and the like.

By providing such identification portion 9, it is possible to automatically set the type of transmission information. Also, since it is unnecessary to add a special processing to the application programs for notifying the type of transmission information to the transmission scheme selection portion 5, the existing application programs may be used without any modifications. The foregoing is the description of step ST101.

Step ST102:

In the measurement portion 4, measurements are made on various transmission path properties such as, e.g., maximum transmission rate, average transmission rate, temporal fluctuation of transmission rate, transmission delay time, temporal fluctuation of transmission delay time, error rate, received signal intensity and the like.

Step ST103:

In the transmission scheme selection portion 5, an evaluation scheme in accordance with the type of transmission information set by the signal Ds is selected from a plurality of different evaluation schemes. For example, in case of constructing the transmission scheme selection portion as shown in FIG. 4, an evaluation scheme in response to the type of transmission information is selected from the evaluation portions 501 to 50n, thereby selecting the evaluation scheme. Alternatively, if the transmission scheme selection portion 5 is constructed as shown in FIG. 6, the coefficients are generated in response to the type of transmission information set by the signal Ds, thereby selecting the evaluation scheme.

Step ST104:

The evaluation scheme selected in step S103 is used to prioritize the transmission schemes based on the measurement results S4 of the transmission path properties. For example, if the transmission scheme selection portion 5 is constructed as shown in FIG. 5, evaluation function values for respective transmission schemes are calculated by the evaluation value calculation portions 5001 to 500k for the selected evaluation portion, thereby prioritizing the transmission schemes. Alternatively, if the transmission scheme selection portion 5 is constructed as shown in FIG. 6, calculated are evaluation function values of the respective transmission schemes in the coefficients S52 that are generated by using the measurement values S4 of the transmission path properties as variables, thereby prioritizing the transmission schemes.

Step ST105:

The transmission scheme to be used for communications is selected from the plurality of transmission schemes in accordance with the prioritized result in step ST104. For example, if the transmission scheme selection portion 5 is constructed as shown in FIG. 5, a transmission scheme to be used for communications is selected in response to the comparison result of the evaluation function values calculated by the evaluation value calculation portions 5001 to 500k of the selected evaluation portion. Alternatively, if the transmission scheme selection portion 5 is constructed as shown in FIG. 6, the transmission scheme to be used for communications is selected in response to the comparison result of the evaluation function values of the evaluation value calculation portions 531 to 53k as calculated in the generated coefficients S52.

Figure 7:
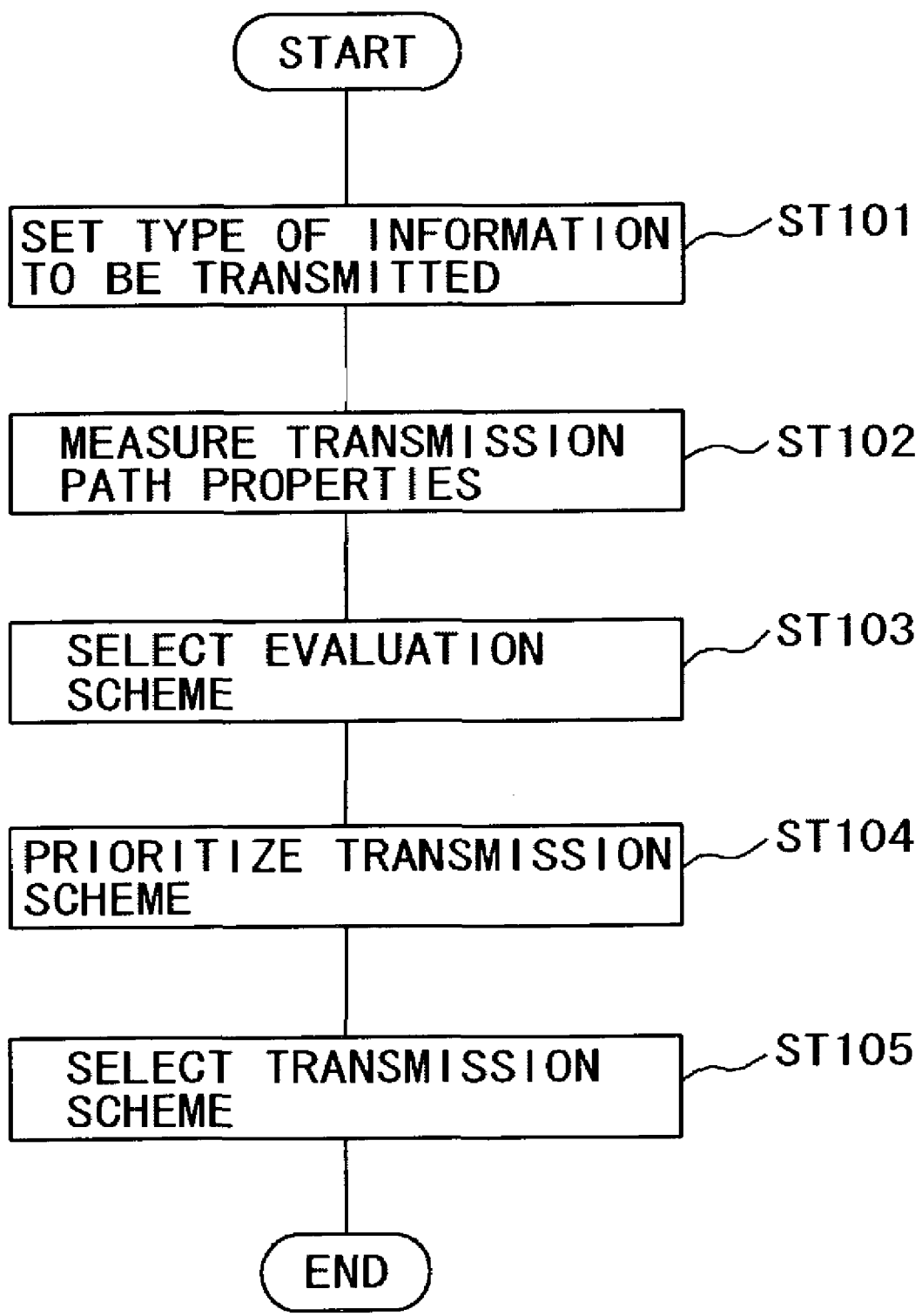
FIG. 7 is a flowchart for describing the transmission scheme selection operation in the communication apparatus in FIG. 1.

It should be noted that the processing as shown in the above mentioned flowchart in FIG. 7 is preferably performed periodically or at an appropriate interval in order to select the transmission scheme most suitable for the transmission path in which nature of the transmission path may change time to time.

As described hereinabove, according to the communication apparatus as shown in FIG. 1, since the transmission scheme to be used for communications is suitably selected in accordance with the type of transmission information, it is possible to select better transmission scheme as compared to a conventional communication system in which transmission schemes are selected by a fixed condition regardless of types of transmission information, thereby improving communication quality.

(Second Embodiment)

Figure 11:
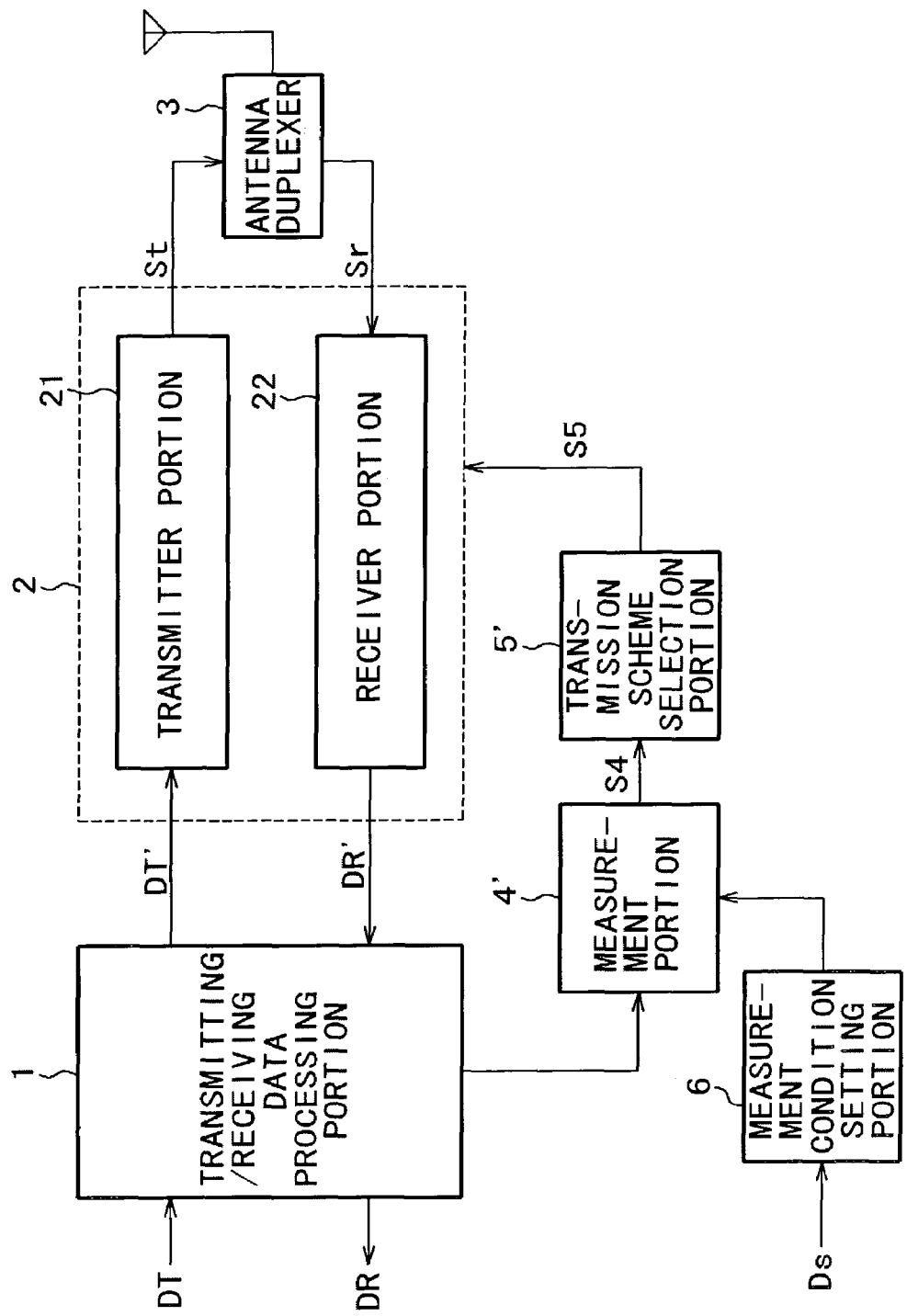
FIG. 11 is a schematic block diagram showing a simplified construction of the communication apparatus according to a second embodiment of the present invention.

Below, a second embodiment of the present invention will be described hereunder. FIG. 11 is a schematic block diagram of the second embodiment of the communication apparatus according to the present invention. The communication apparatus as shown in FIG. 11 includes a transmitting/received data processing portion 1, a transmitter/receiver portion 2, an antenna duplexer 3, a measurement portion 4', a transmission scheme selection portion 5' and a measurement condition setting portion 6.

In FIG. 11, the same reference numerals as those in FIG. 1 represent the identical constituent elements. Since their constructions have been described hereinabove, no duplicated description is given herein. The measurement portion 4' monitors data to be processed in the transmitting/received data processing portion 1 and measures transmission path properties such as, e.g., the maximum data transmission rate, average data transmission rate, temporal fluctuation of transmission rate, transmission delay time, temporal fluctuation of transmission delay time, error rate and the like under conditions set by the measurement condition setting portion 6. Although not shown in FIG. 11, it is possible to measure, e.g., received signal intensity, decoding error rate in the decoder 224 and the like by monitoring signals at various points in the transmitter/receiver portion 2.

The transmission scheme selection portion 5' prioritizes a plurality of predetermined transmission schemes based on the measurement results of the transmission path properties by the measurement portion 4', and selects a transmission scheme to be used for communications from the plurality of transmission schemes in accordance with results of such prioritization. The prioritizing method may include, for example, calculating evaluation function values set for respective transmission schemes using the measurements S4 of the transmission path properties as variables and comparing the evaluation function values.

The measurement condition setting portion 6 sets measurement conditions for respective transmission path properties in the measurement portion 4' in response to the signal Ds that designates types of transmission information. For example, shorter average transmission rate measurement interval and period are set for information such as broadcasting contents in which generation, transmission and reproduction processing are performed in real time manner. In this manner, since suitable transmission scheme can be selected smoothly in response to fluctuation in average transmission rate, it is possible to suppress data overflow or depletion in the receiver buffer. On the other hand, in case of streaming data such as prerecorded moving images, since the receiver buffer is normally secured in response to the necessary transmission rate, a relatively longer average transmission rate measurement interval and period are set for such information. For information having unstable data transmission timing such as files to be transferred through Internet, the measurement interval and period of transmission path properties are set relatively longer. In this manner, it is possible to prevent transmission schemes from being changed frequently during a period such that no information is transmitted or received.

Operations during the transmission scheme selection in the communication apparatus shown in FIG. 11 having the construction as described hereinabove will be described with reference to a flowchart in FIG. 12.

Step ST201:

The type of transmission information is set at the measurement condition setting portion 6 in response to the signal Ds. There are, e.g., three ways of designating the type of transmission information at the measurement condition setting portion 6 as shown in FIG. 13 to FIG. 15, which are similar to the above described FIG. 8 to FIG. 10.

Figure 13:
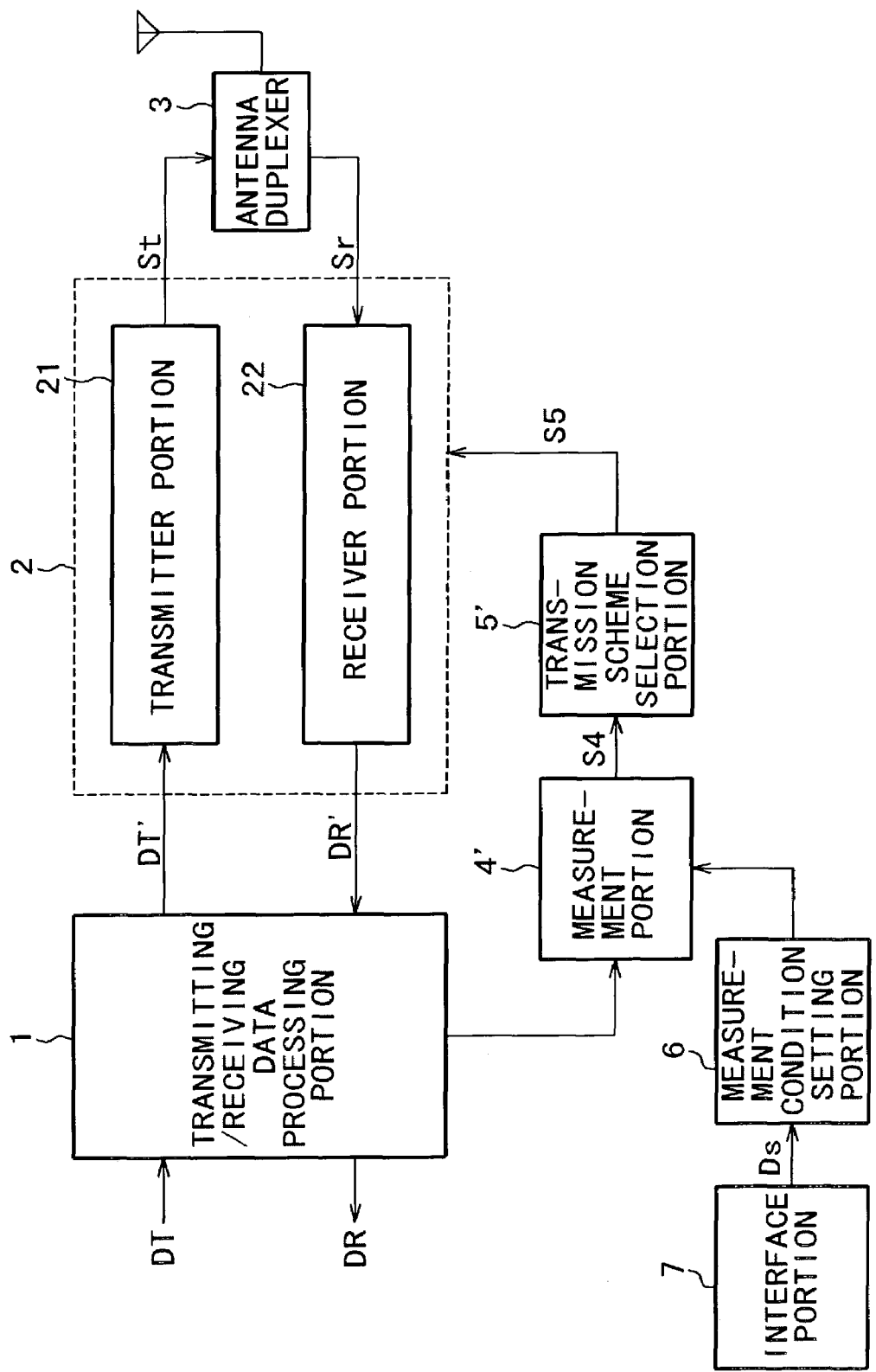
FIG. 13 is a schematic block diagram showing an exemplified construction of the communication apparatus in case of designating types of transmission information using the interface portion of the communication apparatus in FIG. 11.

FIG. 13 is a schematic block diagram showing an exemplified construction of the communication apparatus in case of designating types of transmission information using the interface portion. In FIG. 13, the same reference numerals as those in FIG. 8 and FIG. 11 represent like constituent elements. As shown in FIG. 13, the user can directly set the type of transmission information at the measurement condition setting portion 6 by the use of the interface portion 7.

Figure 14:
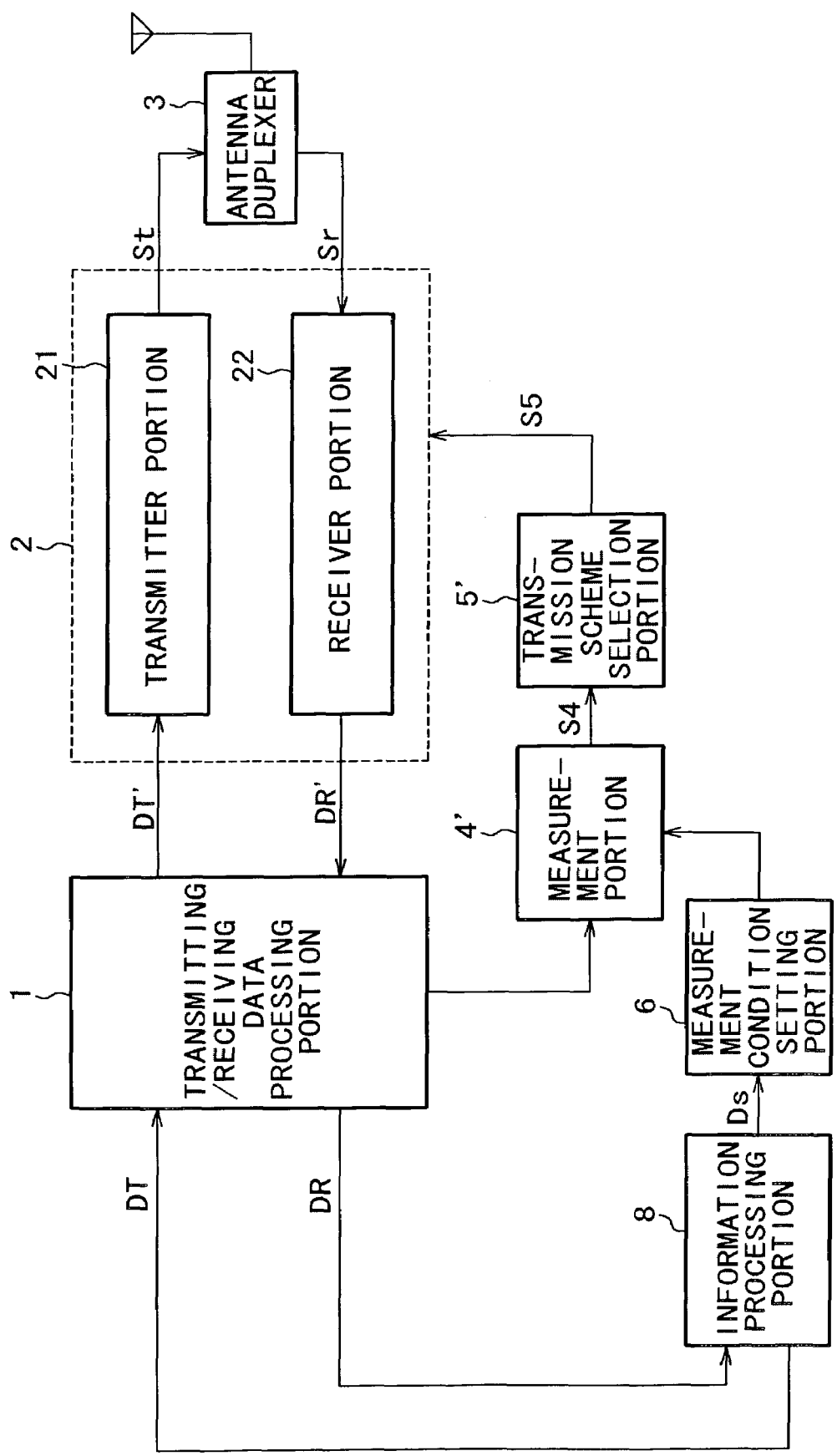
FIG. 14 is a schematic block diagram of an exemplified construction in case of designating types of transmission information using the information processing portion of the communication apparatus in FIG. 11.

FIG. 14 is a schematic block diagram showing an exemplified construction of the communication apparatus in case of designating the type of transmission information by using an information processing portion. Again, in FIG. 14, the same reference numerals as those in FIG. 9 and FIG. 11 represent like constituent elements. By providing the information processing portion 8 as shown in FIG. 14, it is possible to automatically set the type of transmission information at the measurement condition setting portion 6. Additionally, the type of transmission information is reliably set as compared to the user's manual setting as shown in FIG. 13.

Figure 15:
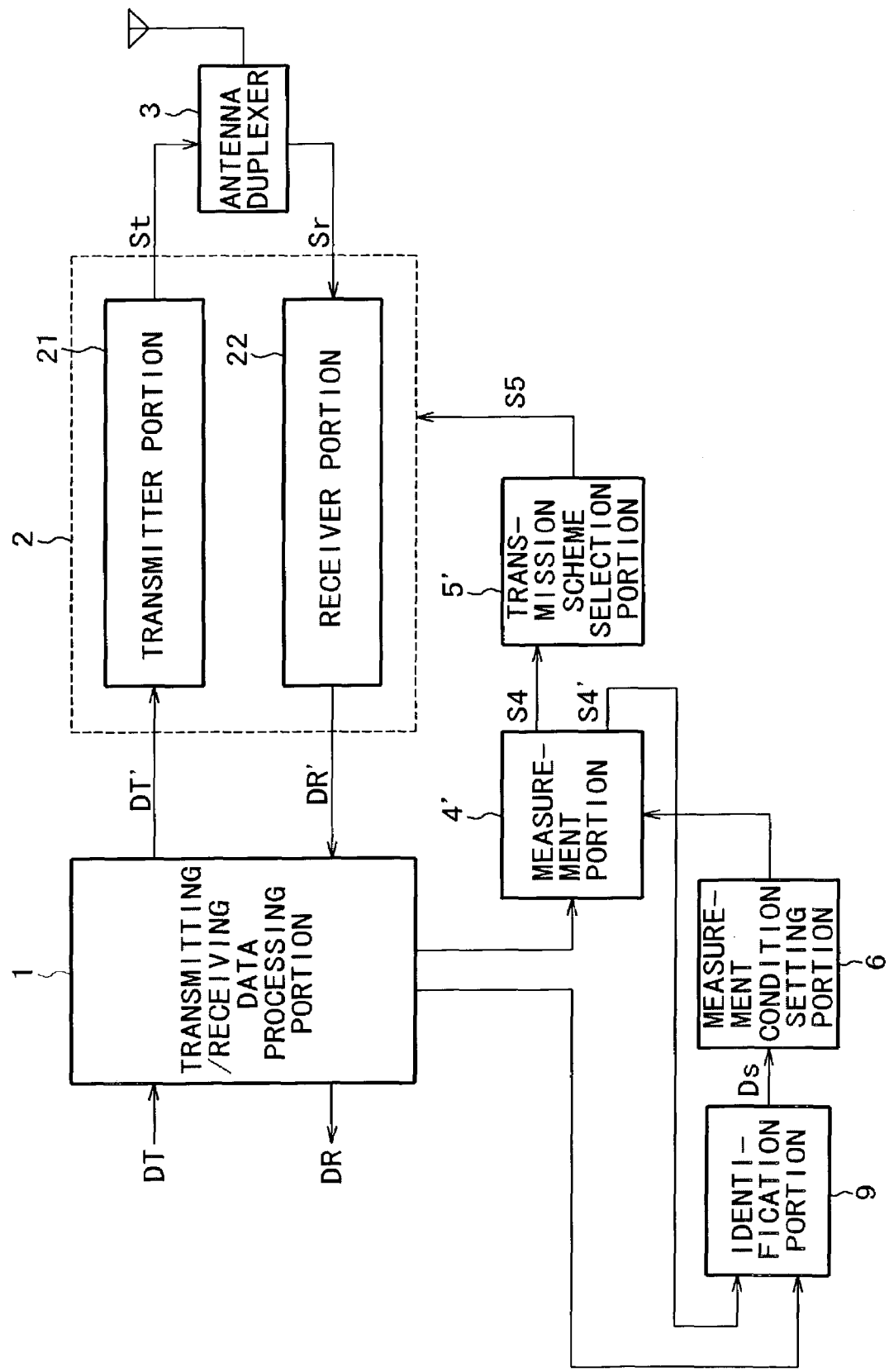
FIG. 15 is a schematic block diagram showing an exemplified construction in case of designating types of transmission information using the identification portion of the communication apparatus in FIG. 11.
Figure 16:
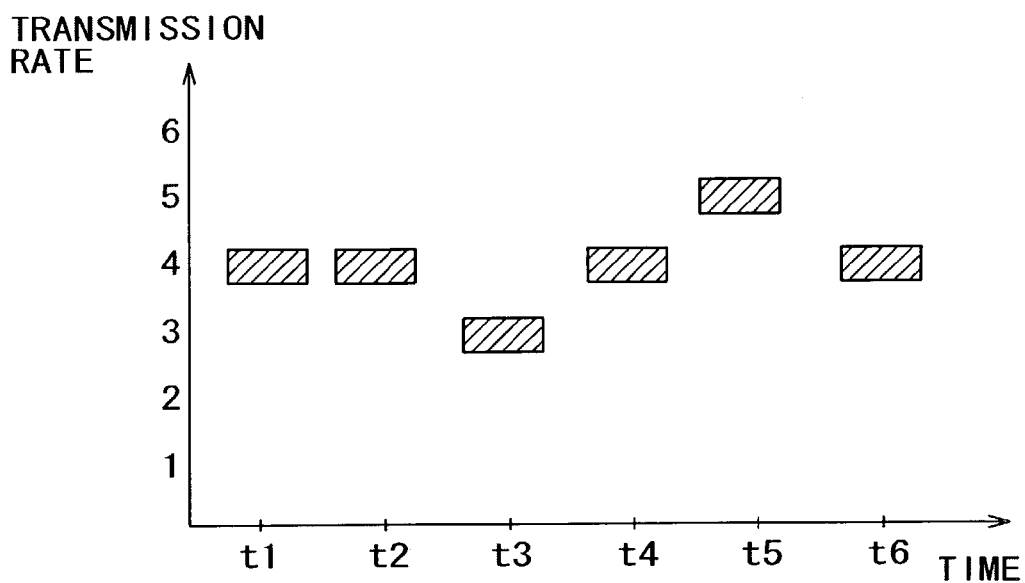
FIG. 16 is a graph to show an example of automatically switching transmission schemes in accordance with communication conditions.
Figure 17:
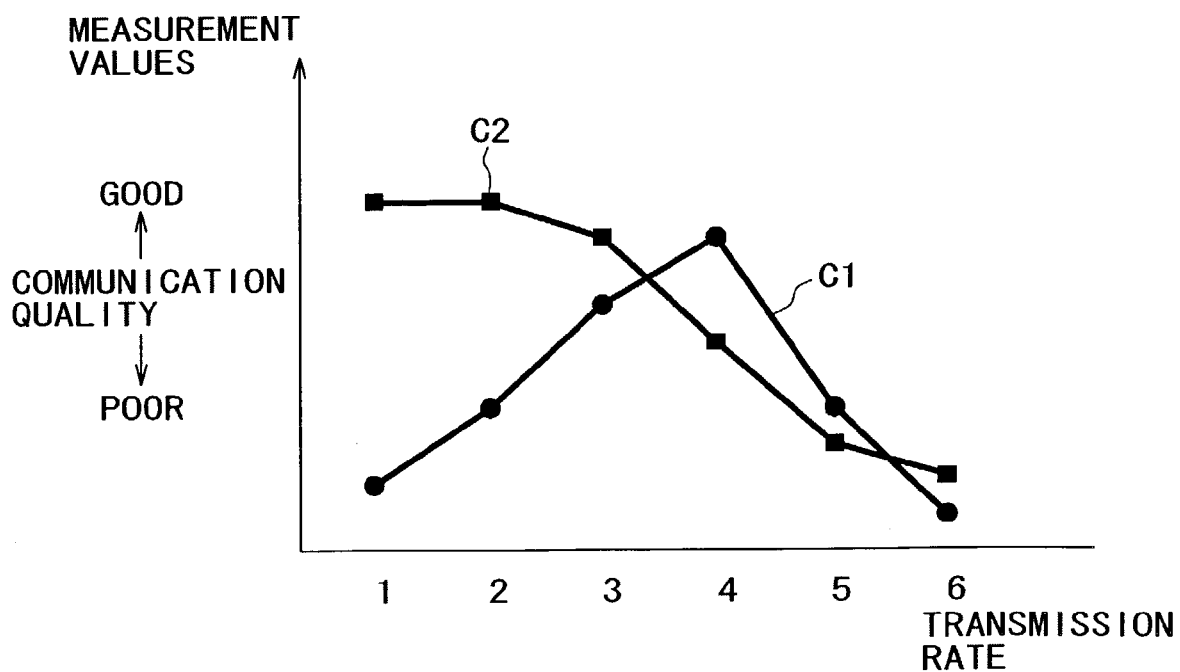
FIG. 17 is a graph to show measurements of transmission path properties for different transmission schemes.

FIG. 15 is a schematic block diagram showing an exemplified construction of the communication apparatus in case of designating the type of transmission information by using the identification portion. In FIG. 15, the same reference numerals as those in FIG. 10 and FIG. 11 represent like constituent elements. As shown in FIG. 15, it is also possible to automatically set the type of transmission information at the measurement condition setting portion 6 by the provision of the identification portion 9. Additionally, since there is no need for providing additional processing in application programs for notifying the type of transmission information, existing application programs can be used without any modification. The foregoing is the description of step ST201.

Step ST202:

Measurement conditions are set in the measurement portion 4' in accordance with the type of transmission information as set by the measurement condition setting portion 6 in step ST201. For example, length of measurement time, measurement time interval and the like of the above described transmission path properties are set in response to the type of transmission information for respective transmission path properties.

Step ST203:

Under the measurement conditions set by the measurement condition setting portion 6, measured are various transmission path properties such as, e.g., maximum transmission rate, average transmission rate, temporal fluctuation of transmission rate, transmission delay time, temporal fluctuation of transmission delay time, error rate, received signal intensity and the like.

Step ST204:

Transmission systems are prioritized based on the measurement results S4 of the transmission path properties measured in step ST203. For example, evaluation function values set for respective transmission schemes are calculated using the measurement results S4 of the transmission path properties as variables and the evaluation function values are compared to determine the priority order based on the comparison result.

Step ST205:

The transmission scheme to be used for communications is selected from the plurality of transmission schemes in accordance with the resulting priority order of the transmission schemes in step ST104.

Figure 12:
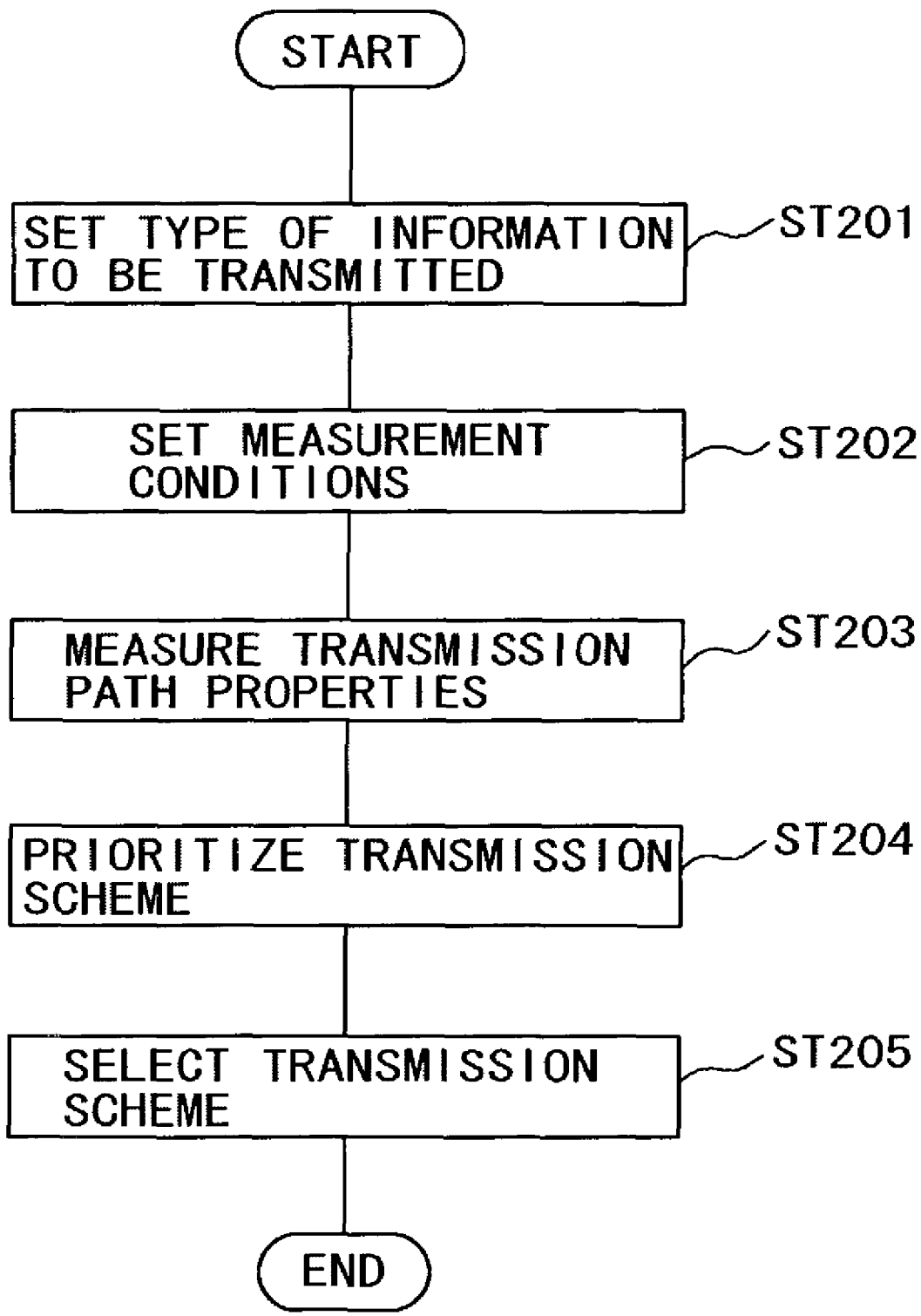
FIG. 12 is a flow chart to describe the transmission scheme selection operation in the communication apparatus in FIG. 11.

It should be noted that the processing as shown in the flowchart in FIG. 12 is performed preferably periodically or at a suitable interval in order to select a suitable transmission scheme for the transmission path properties that are changing time to time.

As described hereinabove, according to the communication apparatus as shown in FIG. 11, when selecting the transmission scheme to be used for communications, measurement conditions of the transmission path properties are properly selected for using as the basis of such selection in response to the type of transmission information. Accordingly, it is possible to select more suitable transmission scheme as compared to a conventional communication apparatus in which the measurement conditions are fixed regardless of the types of transmission information. Accordingly, the communication quality can be improved.

It should be noted that the present invention is not restricted to the above described embodiments and that various modifications, combinations and sub-combinations obvious for a person having an ordinary skill in the art may be made without departing from the scope of the present invention. For example, a part or all of the above constructions in the above mentioned communication apparatus can be replaced by a processing device such as DSP (Digital Signal Processor) which performs the processing in accordance with programs including a part or all of the processing in the flowcharts which are referred for describing the above embodiments.

Furthermore, the modulation scheme and coding rate are mentioned in the above description as examples of selectable transmission schemes. However, the present invention should not be restricted to such examples, and various other transmission schemes can be selected as well.

In the flowchart in FIG. 7, step ST102 for measuring transmission path properties may be executed after step ST103 for selecting the transmission scheme or before step ST101 for setting the type of transmission information.

What is claimed is:

1. A communication apparatus for communications using a transmission scheme that is selected from a plurality of preset transmission schemes, comprising:
    measurement means for measuring at least one of transmission path properties; and
    transmission scheme selection means for prioritizing said transmission schemes based on a measurement result of said at least one of transmission path properties using different evaluation schemes for respective types of transmission information, and for selecting said transmission scheme to be used for communications from said plurality of preset transmission schemes in accordance with a result of said prioritization.

2. The communication apparatus according to claim 1, wherein said transmission scheme selection means comprises:
a plurality of evaluation means for prioritizing said transmission schemes based on said measurement result of transmission path property by using respectively different evaluation schemes; and
selection means for selecting said transmission scheme to be used for communications based on a result of said prioritization of said transmission schemes in said evaluation means, said evaluation means being selected in accordance with said type of transmission information from said plurality of evaluation means.

3. The communication apparatus according to claim 2, wherein:
said evaluation means calculate values of evaluation functions using said measurement result of transmission path property as a variable, said evaluation functions being respectively set for said transmission schemes, and
said selection means compare said values of evaluation functions calculated by said selected evaluation means, and select said transmission scheme to be used for communications in accordance with a result of said comparison.

4. The communication apparatus according to claim 3, wherein:
said evaluation means respectively set weighting coefficients on measurement values of transmission path properties for respective transmission schemes, and calculate said values of evaluation functions for respective transmission schemes by using weighted measurement value if there is only one measurement value, or by using a combination of weighted measurement values if there are plural measurement values.

5. The communication apparatus of claim 1, wherein said transmission scheme selection means include:
coefficient generation means for respectively generating coefficients for said evaluation functions determined for respective transmission schemes in accordance with said type of transmission information;
calculation means for calculating values of said evaluation functions with said generated coefficients for said respective transmission schemes by using said measurement result of transmission path property as a variable; and
selection means for comparing said values of evaluation functions for respective transmission schemes calculated in said calculation means and selecting said transmission scheme to be used for communications in accordance with a result of said comparison.

6. The communication apparatus according to claim 5, wherein
said coefficient generation means generates preset weighting coefficients for said respective transmission schemes in accordance with said type of transmission information; and
said calculation means respectively set said weighting coefficients on said measurement value of the transmission path property for respective transmission schemes, and calculate said values of evaluation functions for respective transmission schemes by using said weighted measurement value if there is only one measurement value, or a result of combinations of said weighted measurement values if there are plural measurement values.

7. The communication apparatus according to claim 1, further comprising:
interface means for generating a type-designation signal for designating said type of transmission information in response to a preset input operation; wherein
said transmission scheme selection means prioritize said transmission information by using an evaluation scheme corresponding to said type-designation signal generated.

8. The communication apparatus according to claim 1, further comprising:
information processing means for generating transmission information to be transmitted or processing received transmission information, and notifying to said transmission scheme selection means said type of transmission information to be generated or processed; wherein
said transmission scheme selection means prioritize said transmission information by using said evaluation scheme corresponding to said type of transmission information notified by said information processing means.

9. The communication apparatus according to claim 1, further comprising:
identification means for identifying said type of transmission information based on at least one of results of contents analysis of said transmission information and measurement of said measurement means; wherein
said transmission scheme selection means prioritize said transmission information by using said evaluation scheme corresponding to said type of transmission information identified in said identification means.

10. The communication apparatus according to claim 9, wherein
said identification means identify said type of transmission information based on at least one of results of contents analysis of said transmission information, measurement of temporal fluctuation of the transmission rate and measurement of transmission delay time.

11. The communication apparatus according to claim 1, wherein
said measurement means measures, as said transmission path property, at least one of a maximum transmission rate, average transmission rate, temporal fluctuation of transmission rate, transmission delay time, temporal fluctuation of transmission delay time, error rate, received signal intensity and signal-to-noise ratio.

12. A communication apparatus for communications using a transmission scheme that is selected from a plurality of preset transmission schemes, comprising:
measurement means for measuring at least one of transmission path properties under a measurement condition;
measurement condition setting means for setting said measurement condition of said measurement means for said respective transmission path property in accordance with a type of transmission information; and
transmission scheme selection means for prioritizing said transmission schemes based on a measurement result of said at least one of transmission path properties, using different evaluation schemes for respective types of transmission information, and for selecting said transmission scheme to be used for communications from said plurality of preset transmission schemes in accordance with a result of said prioritization.

13. The communication apparatus according to claim 12, wherein said measurement condition setting means set at least one of length of the measurement time of said transmission path property and time interval of such measurements.

14. The communication apparatus according to claim 12, further comprising:
interface means for generating a type-designation signal for designating said type of transmission information in response to a preset input operation; wherein
said measurement condition setting means set said measurement condition in response to said type-designation signal generated.

15. The communication apparatus according to claim 12, further comprising:
information processing means for generating information to be transmitted or processing received information, and for notifying said type of generated or processed information to said measurement condition setting means; wherein
said measurement condition setting means set said measurement condition corresponding to said type of transmission information notified from said information processing means.

16. The communication apparatus according to claim 12, further comprising:
identification means for identifying said type of transmission information based on at least one of results of contents analysis of said transmission information and measurement of said measurement means; and
said measurement condition setting means set said measurement condition corresponding to said type of transmission information as identified in said identification means.

17. The communication apparatus according to claim 16, wherein
said identification means identify said type of transmission information based on at least one of results of contents analysis of said transmission information, measurement of temporal fluctuation of transmission rate and measurement of transmission delay time.

18. The communication apparatus according to claim 12, wherein
said measurement means measures, as said transmission path property, at least one of a maximum transmission rate, average transmission rate, temporal fluctuation of transmission rate, transmission delay time, temporal fluctuation of transmission delay time, error rate, received signal intensity and signal-to-noise ratio.

19. A communication method for communications using a transmission scheme that is selected from a plurality of preset transmission schemes, comprising:
measuring at least one of transmission path properties;
prioritizing said transmission schemes based on a measurement result of said at least one of transmission path properties using different evaluation schemes for respective types of transmission information;
selecting the transmission scheme to be used for communications from said plurality of preset transmission schemes in accordance with a result of said prioritization.

20. The communication method according to claim 19, wherein
an evaluation scheme is selected from a plurality of evaluation schemes in accordance with said type of transmission information;
said transmission schemes are prioritized based on said measurement result of transmission path property by using selected evaluation scheme; and
said transmission scheme to be used for communications is selected based on a result of said prioritization.

21. The communication method according to claim 20, wherein
values of evaluation functions pre-assigned for respective transmission schemes are calculated in said evaluation scheme selected by using said measurement result of transmission path property as a variable; and
said values of evaluation functions calculated for respective transmission schemes are compared so as to select said transmission scheme to be used for communications in accordance with a result of said comparison.

22. The communication method according to claim 21, wherein
said measurement value of transmission path property is weighted by using weighting coefficients set for respective transmission schemes in said selected evaluation scheme, and said values of evaluation functions for respective transmission schemes are calculated by using said weighted measurement value if said measurement value is only one or a result of combinations of said weighted measurement values if said measurements values are plural; and
said values of evaluation functions calculated for respective transmission schemes are compared so as to select said transmission scheme to be used for communications in accordance with a result of said comparison.

23. The communication method according to claim 19, wherein
coefficients for preset evaluation functions are generated in accordance with said type of transmission information;
said values of evaluation functions with said coefficients generated for said respective transmission schemes are calculated by using said measurement value of transmission path property as a variable; and
said values of evaluation functions calculated for respective transmission schemes are compared so as to select said transmission scheme to be used for communications in accordance with a result of said comparison.

24. The communication method according to claim 23, wherein
preset weighting coefficients corresponding to said type of transmission information for respective transmission schemes are generated;
said measurement value of transmission path property is weighted by said weighting coefficients generated for respective transmission schemes so as to calculate said values of evaluation functions for respective transmission schemes by using said weighted measurement value if said measurement value is only one or a result of combinations of said weighted measurement values if the measurement values are plural; and
said values of evaluation functions calculated for respective transmission schemes are compared so as to select said transmission scheme to be used for communications in accordance with a result of said comparison.

25. The communication method according to claim 19, wherein
said type of transmission information is identified based on at least one of results of contents analysis of transmission information and measurement of transmission path property; and
said transmission information is prioritized by using said evaluation scheme corresponding to said identified type of transmission information.

26. A communication method for communications using a transmission scheme that is selected from a plurality of preset transmission schemes, comprising:
  setting a measurement condition for measuring at least one of transmission path properties in accordance with a type of transmission information;
  measuring said at least one of transmission path properties under said measurement condition set;
  prioritizing said transmission schemes based on a measurement result of said at least one of transmission path properties using different evaluation schemes for respective types of transmission information; and
  selecting said transmission scheme to be used for communications from said plurality of preset transmission schemes in accordance with a result of said prioritization.

27. The communication method according to claim 26, wherein
  at least one of length of measurement time of said transmission path property and a measurement interval is set as said measurement condition of transmission path property.

28. The communication method according to claim 26, wherein
  said type of transmission information is identified based on at least one of results of the contents analysis of transmission information and measurements of transmission path property; and
  said measurement condition of transmission path property is set in accordance with said type of transmission information identified.

29. In a communication apparatus for communications using a transmission scheme that is selected from a plurality of preset transmission schemes, a computer readable medium including computer executable instructions, wherein the instructions, when executed by a processor, cause the processor to perform a method comprising:
  measuring at least one of transmission path properties;
  prioritizing said transmission schemes based on a measurement result of said at least one of transmission path properties using different evaluation schemes for respective types of transmission information; and
  selecting said transmission scheme to be used for communications from said plurality of preset transmission schemes in accordance with a result of said prioritization.

30. In a communication apparatus for communications by using a transmission scheme that is selected from a plurality of preset transmission schemes, a computer readable medium including computer executable instructions, wherein the instructions, when executed by a processor, cause the processor to perform a method comprising:
  setting a measurement condition for measuring at least one of transmission path properties in accordance with a type of transmission information;
  measuring said at least one of transmission path properties under said measurement condition set;
  prioritizing said transmission schemes based on a measurement result of said at least one of transmission path properties using different evaluation schemes for respective types of transmission information; and
  selecting said transmission scheme to be used for communications from said plurality of preset transmission schemes in accordance with a result of said prioritization.

31. A communication apparatus for communications using a transmission scheme that is selected from a plurality of preset transmission schemes, comprising:
  a measurement unit configured to select at least one of transmission path properties; and
  a transmission scheme selection unit configured to prioritize said transmission schemes based on a measurement result of said at least one of transmission path properties using a plurality of evaluation schemes, each of said plurality of evaluation schemes corresponding to respective types of transmission information, and to select said transmission scheme to be used for communications from said plurality of preset transmission schemes in accordance with a result of said prioritization.

32. A communication apparatus for communications using a transmission scheme that is selected from a plurality of preset transmission schemes, comprising:
  a measurement unit configured to measure at least one of transmission path properties under a measurement condition;
  a measurement condition setting unit configured to set said measurement condition of said measurement means for said respective transmission path property in accordance with a type of transmission information; and
  a transmission scheme selection unit configured to prioritize said transmission schemes based on a measurement result of said at least one of transmission path properties using different evaluation schemes for respective types of transmission information, and to select said transmission scheme to be used for communications from said plurality of preset transmission schemes in accordance with a result of said prioritization.

* * * * *